United States Patent [19]

Kato et al.

[11] Patent Number: 6,140,389
[45] Date of Patent: *Oct. 31, 2000

[54] OIL-BASED INK FOR PRINTING PLATE BY INK JET PROCESS AND METHOD FOR PREPARING PRINTING PLATE BY INK JET PROCESS

[75] Inventors: Eiichi Kato; Sadao Osawa; Kazuo Ishii, all of Shizouka, Japan

[73] Assignee: Fuji Photo Film Co., Ltd., Kanagawa, Japan

[*] Notice: This patent is subject to a terminal disclaimer.

[21] Appl. No.: 09/009,506

[22] Filed: Jan. 20, 1998

[30] Foreign Application Priority Data

| | | | |
|---|---|---|---|
| Jan. 20, 1997 | [JP] | Japan | 9-021015 |
| Mar. 24, 1997 | [JP] | Japan | 9-088821 |
| Dec. 16, 1997 | [JP] | Japan | 9-346468 |
| Dec. 22, 1997 | [JP] | Japan | 9-353694 |

[51] Int. Cl.$^7$ .......................... C09D 11/02; C09D 11/10; G03G 13/26; G03G 13/28
[52] U.S. Cl. ............................ 523/160; 430/49
[58] Field of Search ................... 523/160, 161; 430/49; 347/54, 55, 100, 103, 107

[56] References Cited

U.S. PATENT DOCUMENTS

| | | | |
|---|---|---|---|
| 4,997,807 | 3/1991 | Mukoyoshi et al. | 503/227 |
| 5,006,441 | 4/1991 | Kato . | |
| 5,039,598 | 8/1991 | Abramsohn et al. | 430/347 |
| 5,073,470 | 12/1991 | Kato et al. . | |
| 5,298,357 | 3/1994 | Hattori et al. | 430/115 |
| 5,582,106 | 12/1996 | Kanda et al. | 101/462 |
| 5,589,312 | 12/1996 | Horie et al. | 430/115 |
| 5,714,250 | 2/1998 | Kato et al. | 428/328 |
| 5,730,787 | 3/1998 | Kasai et al. | 106/2 |
| 5,738,013 | 4/1998 | Kellett | 101/463.1 |

OTHER PUBLICATIONS

Leach, R.H. and Pierce, R.J.; The Printing Ink Manual, Blueprint, London (page 63), 1993.

*Primary Examiner*—Vasu Jagannathan
*Assistant Examiner*—Callie E. Shosho
*Attorney, Agent, or Firm*—Sughrue, Mion, Zinn, Macpeak & Seas, PLLC

[57] ABSTRACT

An oil-based ink for a printing plate by an ink jet process comprising spraying an oil-based ink comprising at least resin particles dispersed in a nonaqueous carrier liquid having an electric resistance of $10^9$ $\Omega$cm or more and a dielectric constant of 3.5 or less on an image receiving layer of a lithographic printing plate precursor dropwise from a nozzle to form an image, and then desensitizing a non-image area of the image receiving layer by a chemical reaction to prepare a lithographic printing plate, the image receiving layer being formed on a water-resistant support and comprising zinc oxide and a binding resin; and a surface of the image receiving layer having a contact angle with water of 50° or more, wherein the resin particles dispersed are copolymer resin particles obtained by polymerization granulation of a solution comprising (i) and (ii): (i) at least one monofunctional monomer (A) which is soluble in a nonaqueous solvent which is at least miscible with the nonaqueous carrier liquid and becomes insoluble in the nonaqueous solvent by polymerization; (ii) at least one resin for dispersion stabilization (P) whcih is soluble in the nonaqueous solvent and is a polymer comprising a repeating unit, wherein a part of the polymer is crosslinked and a polymerizable double bond group which is copolymerizable with the monomer (A) is combined with only one end of at least one main chain of the polymer, and a method for preparing a printing plate by an ink jet process using the ink.

5 Claims, 2 Drawing Sheets

OIL-BASED INK FOR PRINTING PLATE BY INK JET PROCESS AND METHOD FOR PREPARING PRINTING PLATE BY INK JET PROCESS

FIELD OF THE INVENTION

The present invention relates to an oil-based ink for preparing a printing plate by an ink jet process, and a method for preparing a printing plate by an ink jet process using it. More particularly, the present invention relates to an oil-based ink excellent in redispersibility, stability, image reproducibility and printability (press life), and a method for preparing a printing plate by an ink jet process using it.

BACKGROUND OF THE INVENTION

With recent developments in business machines and progress in office automation, in the field of light printing, offset lithographic systems have been widely applied in which printing process is conducted, namely images are formed, on direct imaging lithographic printing plate precursors comprising water-resistant supports having provided thereon image receiving layers having hydrophilic surfaces.

Conventional printing plate precursors for direct imaging lithographic printing comprise supports formed of paper or plastic films which are subjected to water-resistant treatments having provided thereon image accepting layers (or image receiving layers) containing inorganic pigments, water-soluble resins and water resistance imparting agents. Methods are known in which lipophilic images are formed on such direct imaging lithographic printing plate precursor with typewriters or by hand writing using lipophilic ink, or by transferring images from ink ribbons by heat melting with heat transfer printers, thereby preparing printing plates.

However, the printing plates prepared by such methods are not sufficient in mechanical strength of image areas, so that missing easily takes place in the image areas in printing.

On the other hand, ink jet recording is a recording method low in noise and printable at high speed, and has recently been rapidly popularized.

As such ink jet recording systems, there are proposed various ink jet processes such as a so-called electric field controlling system in which ink is discharged using electrostatic attraction, a so-called drop-on-demand system (pressure pulse system) in which ink is discharged using the oscillation pressure of a piezoelectric element, and a so-called bubble (thermal) system in which ink is discharged using pressure developed by forming bubbles and allowing them to grow by heating at high temperature, and very detailed images can be obtained by these systems.

In these ink jet recording systems, aqueous ink using water as a main solvent, and oil-based ink using an organic solvent as a main solvent are generally used.

It is also carried out that the above-mentioned lithographic printing plate precursors are made with typewriters using ink jet recording systems, and in this case, aqueous ink in which water is used as a dispersing medium is also employed. However, the aqueous ink has the problem that blurs appear in images on precursor materials, or that the picture drawing speed is decreased because of slow drying. In order to reduce such a problem, a method using oil-based ink in which a nonaqueous solvent is used as a dispersing medium is disclosed in JP-A-54-117203 (the term "JP-A" as used herein means an "unexamined published Japanese patent application").

However, this method is also insufficient, because blurs are observed in actual printing process images, furthermore, blurs are developed in printing, and the number of printing sheets is limited to several hundred at the most. Furthermore, such ink has the problem of being liable to clog a nozzle for discharging minute ink droplets which make it possible to obtain printing process images having high resolution.

In the ink jet recording systems, ink is generally discharged from nozzles through filters, so that abnormal discharge of ink is liable to take place by clogging of the nozzles or the filters, changes in fluidity of ink with time, or other various factors.

This abnormal discharge of ink takes place with respect to not only aqueous ink compositions, but also oil-based ink compositions. Various proposals for improving such abnormal discharge of ink have been submitted. For example, in order to prevent the abnormal discharge of ink at the time when oil-based ink compositions are used, it is proposed that the viscosity and the specific resistance of the ink compositions are controlled as described in JP-A-49-50935, for the ink jet recording system of the electric field controlling system. It is further proposed that the dielectric constant and the specific resistance of solvents used in the ink compositions are controlled as described in JP-A-53-29808.

Furthermore, as attempts to prevent clogging of nozzles caused by general oil-based ink for ink jet printers, there are proposed, for example, methods in which the dispersion stability of pigment particles is improved (e.g., JP-A-4-25573, JP-A-5-25413 and JP-A-5-65443) and methods in which specific compounds are contained as ink compositions (e.g., JP-A-3-79677, JP-A-3-64377, JP-A-4-202386 and JP-A-7-109431).

However, when they are used in image formation of lithographic printing plates, all of them are poor in image strength in printing, and printing plates which can satisfy the press life have not been obtained.

SUMMARY OF THE INVENTION

An object of the present invention is to provide an oil-based ink for a printing plate by an ink jet process excellent in redispersibility, storage stability and press life.

Another object of the present invention is to provide an oil-based ink for a printing plate by an ink jet process which makes it possible to print many sheets of printed material having clear images.

A further object of the present invention is to provide an oil-based ink for a printing plate by an ink jet process which does not induce clogging in a nozzle and in the course of ink supply and stabilizes ink discharge.

A still further object of the present invention is to provide a method for preparing a printing plate by an ink jet process using the above-mentioned oil-based ink.

These and other objects of the present invention have been accomplished by the following:

(1) an oil-based ink for a printing plate by an ink jet process comprising spraying an oil-based ink comprising at least resin particles dispersed in a nonaqueous carrier liquid having an electric resistance of $10^9$ $\Omega$cm or more and a dielectric constant of 3.5 or less on an image receiving layer of a lithographic printing plate precursor dropwise from a nozzle to form an image, and then desensitizing a non-image area of the image receiving layer by a chemical reaction to prepare a lithographic printing plate, the image receiving layer being formed on a water-resistant support and comprising zinc oxide and a binding resin; and a surface of the image receiving layer having a contact angle with water of 50° or more, wherein the resin particles dispersed are copolymer resin particles obtained by polymerization granulation of a solution comprising (i) and (ii):

(i) at least one monofunctional monomer (A) which is soluble in a nonaqueous solvent which is at least miscible with the nonaqueous carrier liquid and becomes insoluble in the nonaqueous solvent by polymerization;

(ii) at least one resin for dispersion stabilization (P) which is soluble in the nonaqueous solvent and is a polymer comprising a repeating unit represented by the following formula (I), wherein a part of the polymer is crosslinked and a polymerizable double bond group which is copolymerizable with the monomer (A) is combined with only one end of at least one main chain of the polymer:

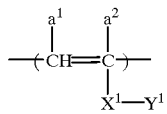

(I)

wherein $X^1$ represents —COO—, —OCO—, —CH$_2$OCO—, —CH$_2$COO—, —O— or —SO$_2$—;

$Y^1$ represents an aliphatic group having 10 to 32 carbon atoms; and $a^1$ and $a^2$ are the same or different and each represents a hydrogen atom, a halogen atom, a cyano group, a hydrocarbon group, —COO—$Z^1$, or —COO—$Z^1$ linked through a hydrocarbon group, in which $Z^1$ represents a hydrogen atom or a hydrocarbon group which may be substituted;

(2) the oil-based ink for a printing plate by an ink jet process described in the above (1), wherein the resin particles dispersed are copolymer particles obtained by polymerization granulation of a solution comprising the monofunctional monomer (A), the resin for dispersion stabilization (P), and at least one monomer (C) represented by the following formula (II-A) which is copolymerizable with the monomer (A):

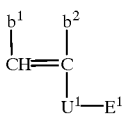

(II-A)

wherein $E^1$ represents an aliphatic group having 8 or more carbon atoms or a substituent having a total number of atoms of 8 or more, provided that hydrogen atoms directly attached to a carbon or nitrogen atom are excluded from the number, represented by the following formula (III-A):

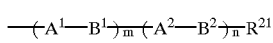

(III-A)

wherein $R^{21}$ represents a hydrogen atom or an aliphatic group having 1 to 18 carbon atoms;

$B^1$ and $B^2$ are the same or different and each represents —O—, —S—, —CO—, —CO$_2$—, —OCO—, —SO$_2$—, —N($R^{22}$)—, —CON($R^{22}$)—, —N($R^{22}$)CO—, —N($R^{22}$)SO$_2$—, —SO$_2$N($R^{22}$)—, —NHCO$_2$— or —NHCONH—, in which $R^{22}$ has the same meaning as $R^{21}$;

$A^1$ and $A^2$ are the same or different and each represents at least one group selected from a group represented by the following formula (III-Aa) and a hydrocarbon group having 1 to 18 carbon atoms, which each may be substituted, provided that, in the case of two or more, it represents a combination of the group represented by formula (III-Aa) and/or the hydrocarbon group:

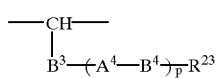

(III-Aa)

wherein $B^3$ and $B^4$ are the same or different and each has the same meaning as $B^1$ and $B^2$;

$A^4$ represents a hydrocarbon group having 1 to 18 carbon atoms which may be substituted;

$R^{23}$ has the same meaning as $R^{21}$; and m, n and p are the same or different and each represents an integer of 0 to 4, provided that m, n and p are not 0 at the same time;

$U^1$ represents —COO—, —CONH—, —CON($E^2$)—, —OCO—, —CONHCOO—, —CH$_2$COO—, —(CH$_2$)$_s$OCO—, —O—, —C$_6$H$_4$— or —C$_6$H$_4$—COO—, in which $E^2$ represents an aliphatic group or a substituent represented by formula (III-A) described above, and s represents an integer of 1 to 4; and $b^1$ and $b^2$ are the same or different and each represents a hydrogen atom, a halogen atom, a cyano group, an alkyl group, —COO—$E^3$ or —CH$_2$COO—$E^3$, in which $E^3$ represents an aliphatic group:

(3) the oil-based ink for a printing plate by an ink jet process described in the above (1), wherein the resin particles dispersed are copolymer resin particles obtained by polymerization granulation of a solution comprising the monofunctional monomer (A), the resin for dispersion stabilization (P), and at least one monofunctional macromonomer (MA) having a weight average molecular weight of $1 \times 10^3$ to $2 \times 10^4$ obtained by combining a polymerizable double bond group represented by the following formula (IV-B) with only one end of a main chain of a polymer comprising a repeating unit corresponding to a monomer represented by the following formula (II-B):

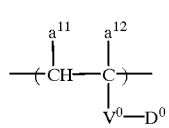

(II-B)

wherein $V^0$ represents —COO—, —OCO—, —(CH$_2$)$_r$COO—, —(CH$_2$)$_r$OCO—, —O—, —SO$_2$—, —CONHCOO—, —CONHCONH—, —CON($D^{11}$)—, —SO$_2$N($D^{11}$)— or a phenylene group, in which $D^{11}$ represents a hydrogen atom or a hydrocarbon group having 1 to 22 carbon atoms, and r represents an integer of 1 to 4;

$a^{11}$ and $a^{12}$ are the same or different and each represents a hydrogen atom, a halogen atom, a cyano group, a hydrocarbon group, —COO—$D^{12}$, or —COO—$D^{12}$ linked through a hydrocarbon group, in which $D^{12}$ represents a hydrogen atom or a hydrocarbon group which may be substituted;

$D^0$ represents a hydrocarbon group having 8 to 22 carbon atoms or a substituent group having a total number of atoms of 8 or more, provided that hydrogen atoms attached to a carbon or nitrogen atom are excluded from the number, represented by the following formula (III-B):

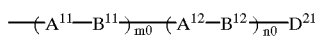
(III-B)

wherein $D^{21}$ represents a hydrogen atom or an aliphatic group having 1 to 22 carbon atoms;

$B^{11}$ and $B^{12}$ are the same or different and each represents —O—, —CO—, —CO$_2$—, —OCO—, —SO$_2$—, —N(D$^{22}$)—, —CON(D$^{22}$)—, or —N(D$^{22}$)CO—, in which $D^{22}$ has the same meaning as $D^{21}$;

$A^{11}$ and $A^{12}$ are the same or different and each represents at least one group selected from a group represented by the following formula (III-Ba) and a hydrocarbon group having 1 to 18 carbon atoms, which each may be substituted, provided that, in the case of two or more, it represents a combination of the group represented by formula (III-Ba) and/or the hydrocarbon group:

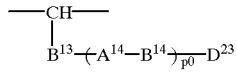
(III-Ba)

wherein $B^{13}$ and $B^{14}$ are the same or different and each has the same meaning as $B^{11}$ and $B^{12}$;

$A^{14}$ represents a hydrocarbon group having 1 to 18 carbon atoms which may be substituted;

$D^{23}$ has the same meaning as $D^{21}$; and $m^0$, $n^0$ and $p^0$ are the same or different and each represents an integer of 0 to 4, provided that $m^0$, $n^0$ and $p^0$ are not 0 at the same time;

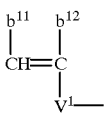
(IV-B)

wherein $V^1$ represents —COO—, —CONHCOO—, —CONHCONH—, —CONH— or a phenylene group; and $b^{11}$ and $b^{12}$ are the same or different and each has the same meaning as $a^{11}$ and $a^{12}$ in formula (II-B);

(4) a method for preparing a printing plate by an ink jet process comprising spraying the oil-based ink described in any one of the above (1) to (3) on a lithographic printing plate comprising a water-resistant support having provided thereon an image receiving layer comprising zinc oxide and a binder resin dropwise from a nozzle to form an image, and then desensitizing a non-image area of the image receiving layer by a chemical reaction to prepare a lithographic printing plate;

(5) the method described in the above (4), wherein the image formation by an ink jet process is conducted by a method of discharging the oil-based ink using an electrostatic field;

(6) the method described in the above (4) or (5), wherein the lithographic printing plate precursor comprises a water-resistant support having provided thereon an image receiving layer having a lithographically printable hydrophilic surface, and the support has a specific electric resistance of $10^{10}$ Ωcm or less at least at an area directly under the image receiving layer;

(7) the method described in any one of the above (4) to (6), wherein the water-resistant support is a support having a specific electric resistance of $10^{10}$ Ωcm or less as a whole of the support; and (8) the method described in any one of the above (4) to (7), wherein the resin particles dispersed in the oil-based ink are electrically detectable particles positively or negatively charged.

Figure 1:
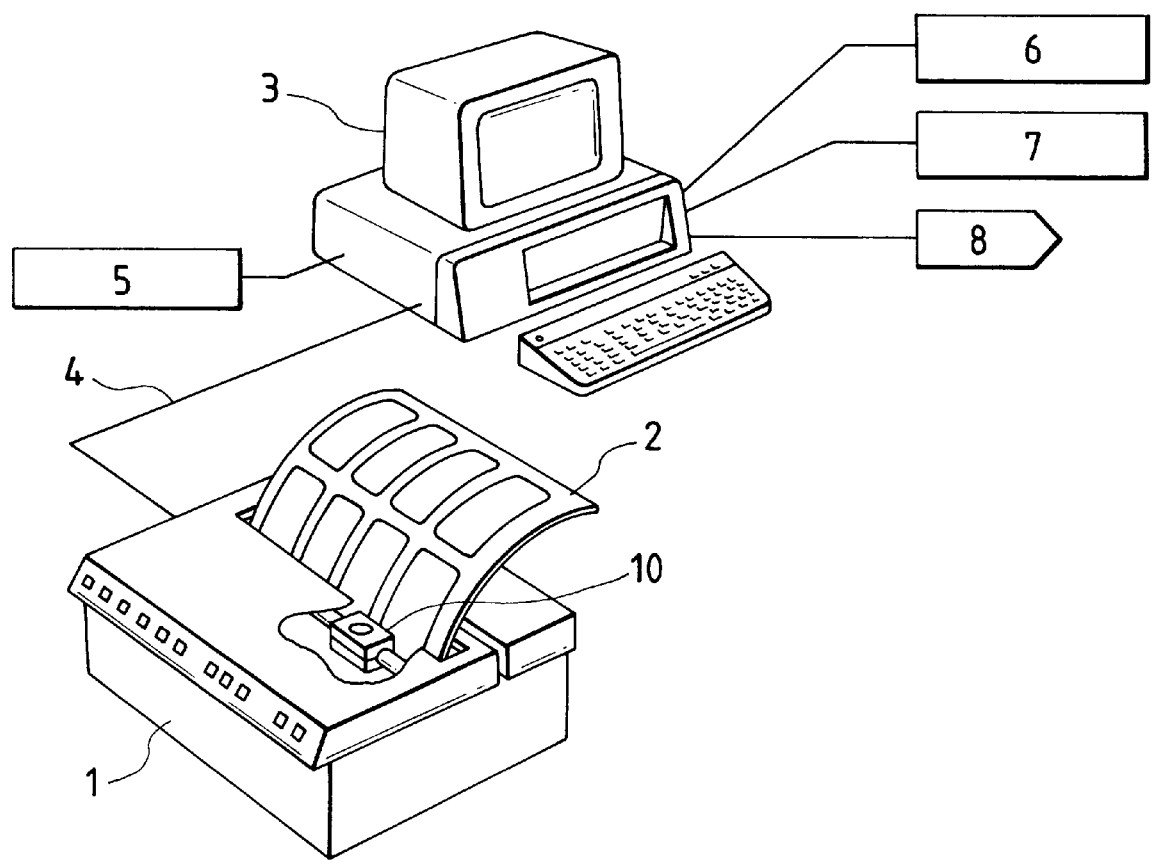
FIG. 1 is a schematic view showing one embodiment of a device system used in the present invention.

| | |
|---|---|
| 1 | Ink jet recording device |
| 2 | Master |
| 3 | Computer |
| 4 | Path |
| 5 | Video camera |
| 6 | Hard disk |
| 7 | Floppy disk |
| 8 | Mouse |
| 10 | Head |
| 10a | Discharge slit |
| 10b | Discharge electrode |
| 10c | Counter electrode |
| 11 | Oil-based ink |
| 101 | Upper unit |
| 102 | Lower unit |

DETAILED DESCRIPTION OF THE INVENTION

The present invention is characterized in that the above-mentioned oil-based ink is discharged on a printing precursor for lithographic printing by an ink jet process to form an image. The oil-based ink used is excellent in dispersion stability, redispersibility and storage stability, and it is possible to print clear images on a number of sheets by use of the resulting lithographic printing plate.

The oil-based ink for use in the present invention is described below.

The nonaqueous carrier liquids having an electric resistance of $10^9$ Ωcm or more and a dielectric constant of 3.5 or less used in the present invention preferably include straight chain or branched aliphatic hydrocarbons, alicyclic hydrocarbons, aromatic hydrocarbons and halogen-substituted products of these hydrocarbons. Specific examples thereof include octane, isooctane, decane, isodecane, decalin, nonane, dodecane, isododecane, cyclohexane, cyclooctane, cyclodecane, benzene, toluene, xylene, mesitylene Isoper-E, Isoper-G, Isoper-H, Isoper-L (Isoper: trade name of Exxon Co.), Shellsol 70, Shellsol 71 (Shellsol: trade name of Shell Oil Co.), Amsco OME and Amsco 460 (Amsco: trade name of Spirits Co.), and mixtures thereof. The upper limit value of the electric resistance of such nonaqueous carrier liquids is about $10^{16}$ Ωcm, and the lower limit value of the dielectric constant is about 1.85.

The nonaqueous dispersed resin particles (hereinafter also referred to as "latex particles"), which are the most important constituent in the present invention, are granulated in the presence of a resin (P) for dispersion stabilization which is soluble in an nonaqueous solvent by (i) polymerizing at least one monofunctional monomer (A) with at least one monomer (B) (referred to as "first embodiment of the present invention") or (ii) polymerizing at least one monofunctional monomer (A) with at least one macromonomer (MA) (referred to as "second embodiment of the present invention").

Here, as the nonaqueous solvents, ones miscible with the nonaqueous carrier liquids of the above-mentioned oil-based ink are basically usable.

That is, as the solvents used in producing the dispersed resin particles, any solvents may be used as long as they are miscible with the above-mentioned carrier liquids. Preferred examples thereof include straight chain or branched aliphatic hydrocarbons, alicyclic hydrocarbons, aromatic hydrocarbons and halogen-substituted products of these hydrocarbons. For example, hexane, octane, isooctane, decane, isodecane, decalin, nonane, dodecane, isododecane, Isoper-E, Isoper-G, Isoper-H, Isoper-L, Shellsol 70, Shellsol 71, Amsco OME and Amsco 460 solvents can be used alone or as a mixture of them.

Solvents which can be used by mixing together with these organic solvents include alcohols (e.g., methyl alcohol, ethyl alcohol, propyl alcohol, butyl alcohol, fluorinated alcohols), ketones (e.g., acetone, methyl ethyl ketone, cyclohexanone), carboxylic acid esters (e.g., methyl acetate, ethyl acetate, propyl acetate, butyl acetate, methyl propionate, ethyl propionate), ethers (e.g., diethyl ether, dipropyl ether, tetrahydrofuran, dioxane), and hydrocarbon halides (e.g., methylene dichloride, chloroform, carbon tetrachloride, dichloroethane, methylchloroform).

These nonaqueous solvents used by mixing are desirably removed by distillation under heating or reduced pressure after polymerization granulation. However, even if they are taken in oil-based ink as latex particle dispersions, no problem is encountered as long as the requirements that the resistance of the ink is $10^9$ Ωcm or more and that the dielectric constant is 3.5 or less satisfied.

Usually, it is preferred that solvents similar to the carrier liquids are used in the stage of the production of resin dispersions. As described above, such solvents include straight chain or branched aliphatic hydrocarbons, alicyclic hydrocarbons, aromatic hydrocarbons and hydrocarbon halides.

The monofunctional monomers (A) for use in the present invention may be any, as long as they are monofunctional monomers soluble in nonaqueous solvents, but insolubilized by polymerization. Specific examples thereof include monomers represented by the following formula (V):

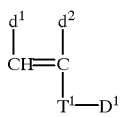

(V)

wherein $T^1$ represents —COO—, —OCO—, —CH$_2$OCO—, —CH$_2$COO—, —O—, —CONHCOO—, —CONHOCO—, —SO$_2$—, —CON(W$^1$)—, —SO$_2$N(W$^1$)— or a phenylene group (a phenylene group is hereinafter described as "—Ph—", including 1,2-, 1,3- and 1,4-phenylene groups), in which $W^1$ represents a hydrogen atom or an aliphatic group having 1 to 8 carbon atoms which may be substituted (e.g., methyl, ethyl, propyl, butyl, 2-chloroethyl, 2-bromoethyl, 2-cyanoethyl, 2-hydroxyethyl, benzyl, chlorobenzyl, methylbenzyl, methoxybenzyl, phenethyl, 3-phenylpropyl, dimethylbenzyl, fluorobenzyl, 2-methoxyethyl, 3-methoxypropyl);

$D^1$ represents a hydrogen atom or an aliphatic group having 1 to 6 carbon atoms which may be substituted (e.g., methyl, ethyl, propyl, butyl, 2-chloroethyl, 2,2-dichloroethyl, 2,2,2-trifluoroethyl, 2-bromoethyl, 2-glycidylethyl, 2-hydroxyethyl, 2-hydroxypropyl, 2,3-dihydroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, N,N-dimethylaminoethyl, N,N-diethylaminoethyl, trimethoxysilylpropyl, 3-bromopropyl, 4-hydroxybutyl, 2-furfurylethyl, 2-thienylethyl, 2-pyridylethyl, 2-morpholinoethyl, 2-carboxyethyl, 3-carboxypropyl, 4-carboxybutyl, 2-phosphoethyl, 3-sulfopropyl, 4-sulfobutyl, 2-carboxyamidoethyl, 3-sulfoamidopropyl, 2-N-methylcarboxyamidoethyl, cyclopentyl, chlorocyclohexyl, dichlorohexyl); and $d^1$ and $d^2$ are the same or different and each has the same meaning as $a^1$ and $a^2$ in formula (I).

Specific examples of the monofunctional monomers (A) include vinyl esters or allyl esters of aliphatic carboxylic acids having 1 to 6 carbon atoms (e. g., acetic acid, propionic acid, butyric acid, monochloroacetic acid, trifluoropropionic acid); alkyl esters or amides having 1 to 4 carbon atoms which may be substituted of unsaturated carboxylic acids such as acrylic acid, methacrylic acid, crotonic acid, itaconic acid and maleic acid (the alkyl groups include, for example, methyl, ethyl, propyl, butyl, 2-chloroethyl, 2-bromoethyl, 2-fluoroethyl, trifluoroethyl, 2-hydroxyethyl, 2-hydroxypropyl, 2-cyanoethyl, 2-nitroethyl, 2-methoxyethyl, 2-methanesulfonylethyl, 2-benzenesulfonylethyl, 2-(N,N-dimethylamino)ethyl, 2-(N,N-diethylamino) ethyl, 2-carboxyethyl, 2-phosphoethyl, 4-carboxybutyl, 3-sulfopropyl, 4-sulfobutyl, 3-chloropropyl, 2-hydroxy-3-chloropropyl, 2-furfurylethyl, 2-pyridinylethyl, 2-thienylethyl, trimethoxysilylpropyl and 2-carboxyamidoethyl); styrene derivatives (e.g., styrene, vinyltoluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene, N,N-dimethylaminomethylstyrene, vinylbenzenecarboxyamide, vinylbenzenesulfoamide); unsaturated carboxylic acids such as acrylic acid, methacrylic acid, crotonic acid, maleic acid and itaconic acid; cyclic acid anhydrides of maleic acid and itaconic acid; acrylonitrile; methacrylonitrile; and heterocyclic compounds having polymerizable double bond groups (specifically, for example, compounds described in "Polymer Data Handbook, -Fundamental Volume-", edited by Kobunshi Gakkai, pages 175 to 184, Baifukan (1986), e.g., N-vinylpyridine, N-vinylimidazole, N-vinyl-pyrrolidone, vinylthiophene, vinyltetrahydrofuran, vinyloxazoline, vinylthiazole, N-vinylmorpholine).

Two or more kinds of monomers (A) may be used in combination.

The resins for dispersion stabilization (P) used for obtaining stable resin dispersions in the nonaqueous solvents from the solvent-insoluble polymers produced by polymerization of the monomers in the present invention are described.

The resin for dispersion stabilization (P) used in the present invention is a polymer containing at least repeating units represented by the above-mentioned general formula (I), wherein main polymer chains thereof are partly crosslinked, and a polymerizable double bond group copolymerizable with the monomer (A) is combined with only one end of the main polymer chain.

In the repeating unit represented by formula (I), the aliphatic group and the hydrocarbon group may be substituted.

In formula (I), $X^1$ preferably represents —COO—, —OCO—, —CH$_2$OCO—, —CH$_2$COO— or —O—, and more preferably —COO—, —CH$_2$COO— or —O—.

$Y^1$ preferably represents an alkyl, alkenyl or aralkyl group having 6 to 32, preferably 8 to 22, carbon atoms and may be substituted. Examples of the substituent include a halogen atom (e.g., fluorine, chlorine, bromine), —O—$Z^2$, —COO—$Z^2$ and —OCO—$Z^2$ (in which $Z^2$ represents an alkyl group having 6 to 22 carbon atoms, e.g., hexyl, octyl, decyl, dodecyl, hexadecyl, octadecy). More preferably, $Y^1$ represents an alkyl or alkenyl group having 10 to 22 carbon atoms. Examples thereof include decyl, dodecyl, tridecyl, tetradecyl, hexadecyl, octadecyl, docosanyl, eicosanyl, decenyl, dodecenyl, tetradecenyl, hexadecenyl and octadecenyl groups.

$a^1$ and $a^2$ are the same or different and each preferably represents a hydrogen atom, a halogen atom (e.g., fluorine, chlorine, bromine), a cyano group, an alkyl group having 1 to 8, preferably 1 to 3, carbon atoms, —COO—$Z^3$ or —COO—$Z^3$ linked through a hydrocarbon group having 1 to 8 carbon atoms (more preferably CH$_2$COO—$Z^3$) (wherein $Z^3$ represents an aliphatic group having 1 to 22 carbon atoms such as methyl, ethyl, propyl, butyl, heptyl, hexyl, octyl, nonyl, decyl, dodecyl, tridecyl, tetradecyl, hexadecyl, octadecyl, eicosanyl, docosanyl, pentenyl, hexenyl, heptenyl, octenyl, decenyl, dodecenyl, tridecenyl, tetradecenyl, hexadecenyl or octadecenyl, which may have a substituent group similar to one represented by $Y^1$ described above).

More preferably, $a^1$ and $a^2$ each represents a hydrogen atom, an alkyl group having 1 to 3 carbon atoms (e.g., methyl, ethyl, propyl), —COO—$Z^4$ or —CH$_2$COO—$Z^4$ (wherein $Z^4$ represents an alkyl or alkenyl group having 1 to 12 carbon atoms, e.g., methyl, ethyl, propyl, butyl, hexyl, octyl, decyl, dodecyl, pentenyl, hexenyl, heptenyl, octenyl or decenyl, which each may have a substituent similar to one represented by $Y^1$ described above).

The resins for dispersion stabilization (P) used in the present invention are polymers which contain copolymer components obtained by copolymerizing the monomers corresponding to the repeating units represented by formula (I) with other monomers copolymerizable with the monomers, and in which the main polymer chains thereof are partly crosslinked.

The other copolymerizable monomers may be any, as long as they contain polymerizable double bond groups. Examples thereof include unsaturated carboxylic acids such as acrylic acid, methacrylic acid, crotonic acid and itaconic acid, ester or amide derivatives of unsaturated carboxylic acids having 6 or less carbon atoms, vinyl esters or allyl esters of carboxylic acids, styrene derivatives, methacrylonitrile; acrylonitrile; and heterocyclic compounds containing polymerizable double bond groups. More specifically, they include compounds having the same contents as the monomers (A) to be insolubilized.

In the polymer components of the resin for dispersion stabilization (P), the component of the repeating units represented by formula (I) is 60% by weight or more, preferably 70% by weight or more, more preferably 80% by weight or more, and most preferably 90% by weight or more, based on the total components of the polymer.

As methods for introducing crosslinked structure into the polymers, usually known methods can be utilized, which are (1) methods of allowing multifunctional monomers to coexist, and conducting polymerization in the polymerization reaction of the monomers, and (2) methods of allowing functional groups enhancing the crosslinking reaction to be contained in the polymers, and conducting crosslinking by the polymer reaction.

For the resins for dispersion stabilization (P) used in the present invention, the crosslinking reaction by polymerization is effective from that the methods for producing them are simple and convenient (for example, they have few problems that the long reaction time is required, that the reaction is not quantitative, and that the resins are contaminated with impurities, due to the use of reaction accelerators and the like).

The term "crosslinking reaction by polymerization" means that preferably, the monomer having two or more functional groups is polymerized with the monomer corresponding to the repeating unit represented by formula (I), and a method of crosslinking between polymer chains.

Specific examples of the polymerizable functional groups include CH$_2$=CH—, CH$_2$=CH—CH$_2$—, CH$_2$=CH—CO—O—, CH$_2$=C(CH$_3$)—CO—O—, CH$_3$—CH=CH—CO—O—, CH$_2$=CH—CONH—, CH$_2$=C(CH$_3$)—CONH—, CH$_2$=C(CH$_3$)—CONHCOO—, CH$_2$=C(CH$_3$)—CONHCONH—, CH$_3$—CH=CH—CONH—, CH$_2$=CH—O—CO—, CH$_2$=C(CH$_3$)—O—CO—, CH$_2$=CH—CH$_2$—O—CO—, CH$_2$=CH—NHCO—, CH$_2$=CH—CH$_2$—NHCO—, CH$_2$=CH—SO$_2$—, CH$_2$=CH—CO—, CH$_2$=CH—O— and CH$_2$=CH—S—. Two or more of the above-mentioned polymerizable functional groups contained in the monomer may be the same or different.

Specific examples of the monomers each having two or more of the same polymerizable functional groups include styrene derivatives such as vinylbenzene and trivinylbenzene; polyhydric alcohols (for example, ethylene glycol, diethylene glycol, triethylene glycol, polyethylene glycol #200, #400 and #600, 1,3-butylene glycol, neopentyl glycol, dipropyl glycol, polypropylene glycol, trimethylolpropane, trimethylolethane and pentaerythritol), methacrylic, acrylic or crotonic esters, vinyl ethers or ally ethers of polyhydroxyphenols (e.g., hydroquinone, resorcin, catechol derivatives); vinyl esters, allyl esters, vinyl amides or allyl amides of dibasic acids (e.g., malonic acid, succinic acid, glutaric acid, adipic acid, pimelic acid, maleic acid, phthalic acid, itaconic acid); and condensation products of polyamines (e.g., ethylenediamine, 1,3-propylenediamine, 1,4-butylene-diamine) and carboxylic acids having vinyl groups (e.g., methacrylic acid, acrylic acid, crotonic acid, allylacetic acid).

Furthermore, examples of the monomers each having different polymerizable functional groups include vinyl group-containing ester derivatives or amide derivatives (e.g., vinyl methacrylate, vinyl acrylate, vinyl itaconate, vinyl methacryloylacetate, vinyl methacryloylpropionate, allyl methacryloylpropionate, vinyloxycarbonylmethyl methacrylate, vinyloxycarbonylmethyloxycarbonylethylene acrylate, N-acrylamide, N-allyl methacrylamide, N-allylitaconic acid amide and methacryloylpropionic acid allylamide) of vinyl group-containing carboxylic acids [for example, methacrylic acid, acrylic acid, methacryloylacetic acid, acryloylacetic acid, methacryloylpropionic acid, acryloylpropionic acid, itaconiloylpropionic acid, reaction products of carboxylic anhydrides and alcohols or amines (e.g., allyloxycarbonylpropionic acid, allyloxycarbonylacetic acid, 2-allyloxycarbonylbenzoic acid, allylaminocarbonylpropionic acid)]; or condensation products of aminoalcohols (e.g., aminoethanol, 1-aminopropanol, 1-aminobutanol, 1-aminohexanol, 2-aminobutanol) and vinyl group-containing carboxylic acids.

The monomer having two or more polymerizable functional groups used in the present invention is polymerized in an amount of 10% by weight or less, and preferably in an amount of 8% by weight or less, based on the total monomers, to form the resin soluble in the nonaqueous solvent used in the present invention.

Furthermore, in the resin for dispersion stabilization (P) used in the present invention, the polymerizable functional group copolymerizable with the monomer (A) is combined with one end of at least one main polymer chain.

The polymerizable double bond group may be any functional group polymerizable with the monomer (A), and has the chemical structure that the group is combined with one end of the main polymer chain, or combined therewith through any connecting group. Specifically, examples of such chemical structures include a chemical structure represented by the following formula (VI):

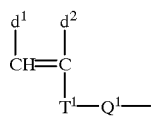
(VI)

wherein $T^1$, $d^1$ and $d^2$ have the same meaning as those in formula (V), respectively; and $Q^1$ represents a single bond directly binding the following polymerizable double bond group (wherein $T^1$, $d^1$ and $d^2$ have the same meaning those described above) to one end of the main polymer chain, or a binding group linked through a connecting group.

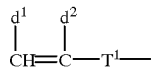

The binding group is constituted by any combination of atomic groups of a carbon-carbon bond (single or double bond), a carbon-hetero atom bond (the hetero atom includes an oxygen atom, a sulfur atom, a nitrogen atom and a silicon atom) and a hetero atom-hetero atom bond. For example, the binding group indicates an independent connecting group selected from atomic groups such as —C($Z^3$)($Z^4$)— ($Z^3$ and $Z^4$ each independently represents a hydrogen atom, a halogen atom (e.g., fluorine, chlorine, bromine), a cyano group, a hydroxyl group, an alkyl group (e. g., methyl, ethyl, propyl), —(CH=CH)—, —$C_6H_{10}$— (a cyclohexylene group), —Ph— (a phenylene group), —O—, —S—, —CO—, —N($Z^5$)—, —COO—, —$SO_2$—, —CON($Z^5$)—, —$SO_2$N($Z^5$)—, —NHCOO—, —NHCONH—, —Si($Z^5$)($Z^6$)— [$Z^5$ and $Z^6$ each independently represents a hydrogen atom or a hydrocarbon group having 1 to 8 carbon atoms (e.g., methyl, ethyl, propyl, butyl, pentyl, hexyl, benzyl, phenetyl, phenyl, tolyl) and —$OZ^7$ ($Z^7$ represents a hydrocarbon group having the same meaning as $Z^5$ described above), or two or more connecting groups constituted by any combination thereof.

The polymerizable double bond groups represented by formula (VI) which are each combined with only one end of the main polymer chain are described below in detail. In the following specific examples, A represents —H, —$CH_3$ or —$CH_2COOCH_3$; B represents —H or —$CH_3$; n represents an integer of 2 to 10; n represents 2 or 3; l represents 1, 2 or 3; p represents an integer of 1 to 4; and q represents 1 or 2.

(1)

(2)

(3)

(4)

(5)

(6)

(7)

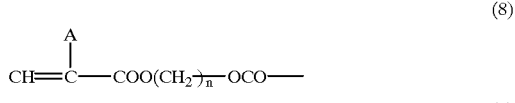
(8)

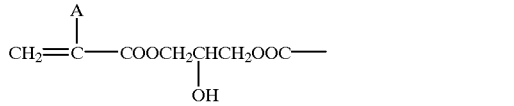
(9)

(10)

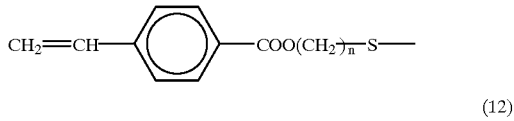
(11)

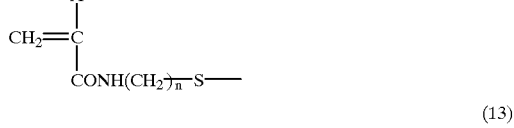
(12)

(13)

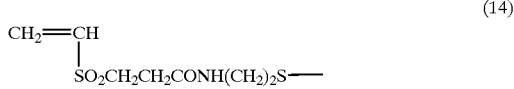
(14)

(15)

(16)

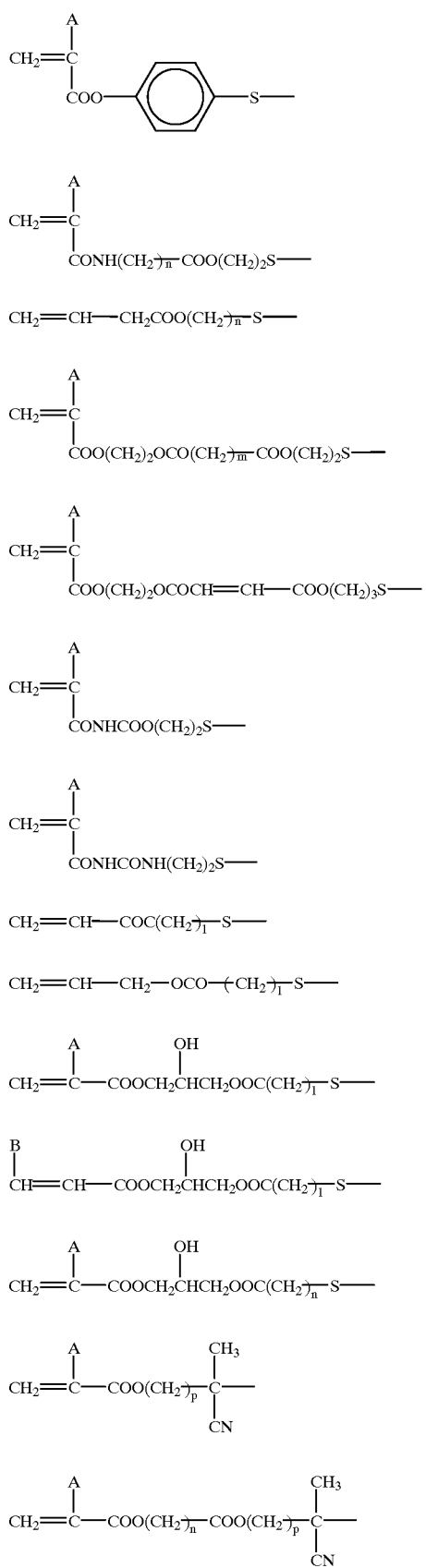

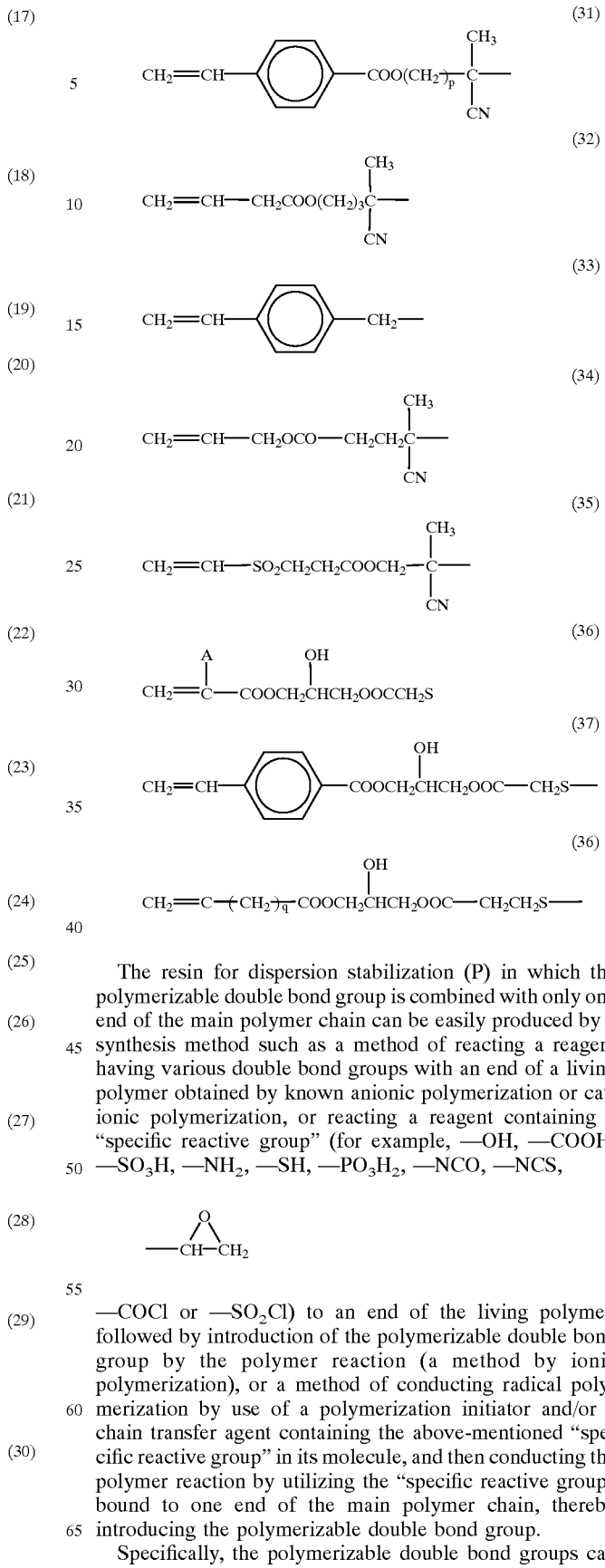

The resin for dispersion stabilization (P) in which the polymerizable double bond group is combined with only one end of the main polymer chain can be easily produced by a synthesis method such as a method of reacting a reagent having various double bond groups with an end of a living polymer obtained by known anionic polymerization or cationic polymerization, or reacting a reagent containing a "specific reactive group" (for example, —OH, —COOH, —SO$_3$H, —NH$_2$, —SH, —PO$_3$H$_2$, —NCO, —NCS, —COCl or —SO$_2$Cl) to an end of the living polymer, followed by introduction of the polymerizable double bond group by the polymer reaction (a method by ionic polymerization), or a method of conducting radical polymerization by use of a polymerization initiator and/or a chain transfer agent containing the above-mentioned "specific reactive group" in its molecule, and then conducting the polymer reaction by utilizing the "specific reactive group" bound to one end of the main polymer chain, thereby introducing the polymerizable double bond group.

Specifically, the polymerizable double bond groups can be introduced according to methods described in reviews, and literatures and patents cited therein, such as P. Dreyfuss & R. P. Quirk, *Encycl. Polym. Sci. Eng.*, 7, 551 (1987), Yoshiki Chujyo & Yuya Yamashita, *Senryo to Yakuhin,* 30, 232 (1985), Akira Ueda & Susumu Nagai, *Kagaku to Kogyo,* 60, 57 (1986), P. F. Rempp & E. Franta, *Advance in Polymer Science,* 58, 1 (1984), Koichi Ito, *Kobunshi Kako,* 35, 262 (1986) and V. Percec, *Applied Polymer Science,* 285, 97 (1984).

More specifically, the methods include a method of synthesizing the polymer having crosslinked structure and the "specific reactive group" combined with only one end of the main polymer chain by (1) a method of polymerizing a mixture of at least one kind of monomer corresponding to the repeating unit represented by formula (I), a multifunctional monomer for introducing the above-mentioned crosslinked structure and a chain transfer agent containing the above-mentioned "specific reactive group" in its molecule by use of a polymerization initiator (for example, a bisazo compound or a peroxide), (2) a method of conducting polymerization by use of a polymerization initiator containing the above-mentioned "specific reactive group" in its molecule without use of the above-mentioned chain transfer agent, or (3) a method of using compounds containing the above-mentioned "specific reactive groups" in their molecules as both polymerization initiator and polymerization initiator, and then, conducting the polymer reaction by utilizing the "specific reactive group", thereby introducing the polymerizable double bond group.

Examples of the chain transfer agents containing specific reactive groups in their molecules include mercapto compounds containing the reactive groups or substituent groups derivable to the reactive groups (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole, 2-mercapto-3-pyridinol) and iodinated alkyl compounds containing the reactive groups or substituent groups derivable to the reactive groups (e.g., iodoacetic acid, iodopropionic acid, 2-iodoethanol, 2-iodoethanesulfonic acid, 3-iodopropanesulfonic acid). Preferred examples thereof include mercapto compounds.

Examples of the above-mentioned polymerization initiators containing reactive groups in their molecules include azobis compounds, such as 4,4'-azobis(4-cyanovaleric acid), 4,4'-azobis(4-cyanovaleric acid chloride), 2,2'-azobis(2-cyanopropanol), 2,2'-azobis(2-cyanopentanol), 2,2'-azobis[2-methyl-N-(2-hydroxyethyl)propioamide], 2,2'-azobis{2-methyl-N-[1,1-bis-(hydroxymethyl)ethyl]propioamide}, 2,2'-azobis{2-methyl-N-[1,1-bis(hydroxymethyl)-2-hydroxyethyl]propioamide}, 2,2'-azobis(2-amidinopropane), 2,2'-azobis[2-methyl-N-(2-hydroxyethyl)propioamide], 2,2'-azobis[2-(5-methyl-2-imidazoline-2-yl)propane], 2,2'-azobis[2-(4,5,6,7-tetrahydro-1H-1,3-diazepine-2-yl)propane], 2,2'-azobis[2-(3,4,5,6,-tetrahydropyrimidine-2-yl)propane], 2,2'-azobis[2-(5-hydroxy-3,4,5,6,-tetrahydropyrimidine-2-yl)-propane], 2,2'-azobis{2-[1-(2-hydroxyethyl)-2-imidazoline-2-yl]propane}, 2,2'-azobis[N-(2-hydroxyethyl)-2-methylpropionamidine] and 2,2'-azobis[N-(4-aminophenyl)-2-methylpropionamidine].

The amounts of these chain transfer agents and the polymerization initiators used are each preferably 0.1 to 15 parts by weight, and more preferably 0.5 to 10 parts by weight, based on 100 parts by weight of the total monomers.

Then, the monomers (C) having a specific substituent represented by formula (II-A) which can be used in combination with the monomer (A) as a preferred embodiment of the present invention are described below.

First, the case where $E^1$ represents an aliphatic group having 8 or more carbon atoms is described in detail.

$E^1$ preferably represents an alkyl group having a total carbon number of 10 or more which may be substituted, or an alkenyl group having a total carbon number of 10 or more. Examples thereof include a decyl group, a dodecyl group, a tridecyl group, a tetradecyl group, a pentadecyl group, a hexadecyl group, a heptadecyl group, an octadecyl group, a docosanyl gorup, an eicosanyl group, a decenyl group, a dodecenyl group, a tridecenyl group, a tetradecenyl group, a hexadecenyl group, an octadecenyl group, a docosenyl group, a linoleyl group and an oleyl group. Substituents thereof include a halogen atom (e.g., fluorine, chlorine, bromine), a hydroxyl group, a cyano group, and an alkoxy group (e.g., methoxy, ethoxy, propoxy, butoxy).

$U^1$ preferably represents —COO—, —CONH—, —CON($E^2$)—, (in which $E^2$ preferably represents an aliphatic group having 1 to 32 carbon atoms (examples of the aliphatic groups include alkyl, alkenyl and aralkyl groups)), —OCO—, —CH$_2$OCO— or —O—. More preferably, $U^1$ is —COO—, —CONH— or —CON($E^2$)—.

$b^1$ and $b^2$ are the same or different and each preferably represents a hydrogen atom, a halogen atom (e.g., fluorine, chlorine, bromine), a cyano group, an alkyl group having 1 to 3 carbon atoms, —COO—$E^3$ or —CH$_2$COO—$E^3$ (in which $E^3$ preferably represents an aliphatic group having 1 to 32 carbon atoms, such as methyl, ethyl, propyl, butyl, hexyl, octyl, decyl, dodecyl, tridecyl, tetradecyl, hexadecyl, octadecyl, docosanyl, pentenyl, hexenyl, heptenyl, octenyl, decenyl, dodecenyl, tetradecenyl, hexadecenyl and octadecenyl). These aliphatic group may have a substituent described in the above $E^1$.

More preferably, $b^1$ and $b^2$ are each a hydrogen atom, an alkyl group having 1 to 3 carbon atoms (e.g., methyl, ethyl, propyl), —COO—$E^3$ or —CH$_2$COO—$E^3$ (in which $E^3$ is more preferably an alkyl or alkenyl group having 1 to 12 carbon atoms, such as methyl, ethyl, propyl, butyl, hexyl, octyl, decyl, dodecyl, tridecyl, tetradecyl, hexadecyl, octadecyl, docosanyl, pentenyl, hexenyl, heptenyl, octenyl, decenyl) which may be substituted.

When $E^1$ represents an aliphatic group having 8 or more carbon atoms in the monomers (C) represented by formula (II-A) as described above, specific examples thereof include esters of unsaturated carboxylic acids such as acrylic acid, α-fluoroacrylic acid, α-chloroacrylic acid, α-cyanoacrylic acid, methacrylic acid, crotonic acid, maleic acid and itaconic acid having aliphatic groups each having a total carbon number of 10 to 32 (the aliphatic groups may contain halogen atoms and substituents such as hydroxyl, amino and alkoxy groups, or heteroatoms such as oxygen, sulfur and nitrogen atoms may intervene carbon-carbon bonds of main chains) (examples of the aliphatic groups include decyl, dodecyl, tridecyl, tetradecyl, hexadecyl, octadecyl, docosadecyl, dodecenyl, hexadecenyl, oleyl, linoleyl and docosenyl); amides of the above-mentioned unsaturated carboxylic acids (the aliphatic groups have the same meaning as given for the esters); vinyl esters or allyl esters of higher fatty acids (examples of the higher fatty acids include lauric acid, myristic acid, stearic acid, oleic acid, linoleic acid and behenic acid) ; and vinyl ethers substituted by aliphatic groups each having a total carbon number of 10 to 32 (the aliphatic groups have the same meaning as given for the aliphatic groups of the above-mentioned unsaturated carboxylic acids).

The case where $E^1$ represents a substituent having a total number of atoms of 8 or more (excluding a hydrogen atom directly attached to a carbon or nitrogen atom) represented by formula (III-A) in the monomer represented by formula (II-A) is described in detail.

$A^1$ and $A^2$ each represents at least one group selected from the group consisting of a group represented by formula (III-Aa) and a hydrocarbon group having 1 to 18 carbon atoms (in the case of two or more, each represents a bond of the group of formula (III-Aa) and/or the hydrocarbon group). More specifically, they are composed of any combinations of atomic groups such as $-C(R^{24})(R^{25})-$ (in which $R^{24}$ and $R^{25}$ each represents a hydrogen atom, an alkyl group or a halogen atom), $-(CH=CH)-$, a cyclohexylene group (the cyclohexylene group is hereinafter often represented by "$-C_6H_{10}-$", including 1,2-, 1,3- and 1,4-cyclohexylene groups) and the group represented by formula (III-Aa).

When $E^1$ represents the substituent having a total number of atoms of 8 or more represented by formula (III-A), it is preferred that a "binding main chain" composed of $U^1$ to $R^{21}$ (namely, $U^1$, $A^1$, $B^1$, $A^2$, $B^2$ and $R^{21}$) in a binding group

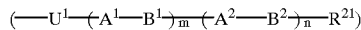

in formula (II-A) has a total number of atoms constituting the binding main chain of 8 or more.

Here, the number of atoms constituting the "binding main chain" means that, for example, when U represents $-COO-$ or $-CONH-$, the oxo group ($=O$ group) and the hydrogen atom are not contained in the number of atoms, and the carbon atom, the ether type oxygen atom and the nitrogen atom constituting the binding main chain are contained in the number of atoms (which is different from the total number of atoms specified in $E^1$). Accordingly, with respect to $-COO-$ and $-CONH-$, the number of atoms is counted as 2. At the same time, when $R^{21}$ represents $-C_9H_{19}$, the hydrogen atoms are not contained in the number of atoms, and the carbon atoms are contained therein. In this case, therefore, the number of atoms is counted as 9.

When $U^1$ represents $-CON(E^2)-$, and $E^2$ represents the substituent represented by formula (III-A), namely

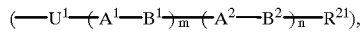

a binding main chain composed of $E^2$ is also included in the above-mentioned "binding main chain". Furthermore, when $A^1$ and $A^2$ each has the group represented by formula (III-Aa), a

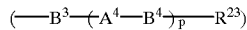

group is also included in the above-mentioned "binding main chain".

In the monomer (C) represented by formula (II-A) as described above, specific examples in the case where $E^1$ represents the substituent shown by formula (III-A) include the following compounds.

In the following formulas (1) to (19), each symbol shows the following contents: $r_1$: $-H$, $-CH_3$, $-Cl$ or $-CN$; $r_2$: $-H$ or $-CH_3$; l: an integer of 2 to 10; p: an integer of 2 to 6; q: an integer of 2 to 4; m: an integer of 1 to 12; n: an integer of 4 to 18.

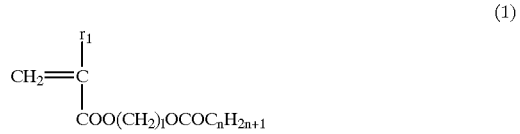
(1)

(2)

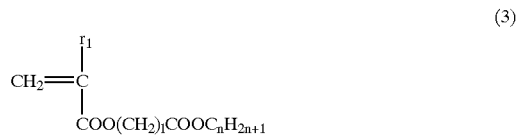
(3)

(4)

(5)

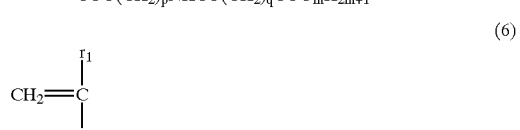
(6)

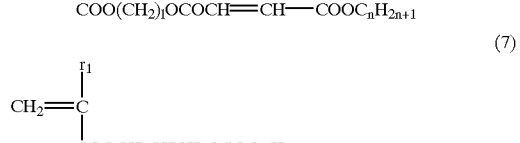
(7)

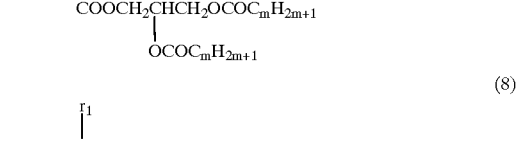
(8)

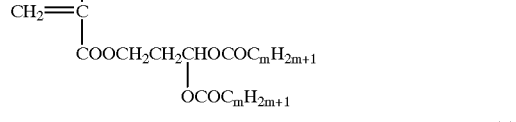
(9)

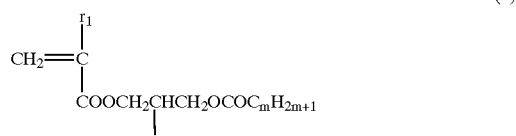
(10)

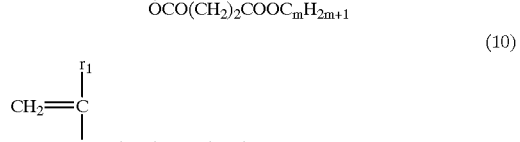
(11)

-continued

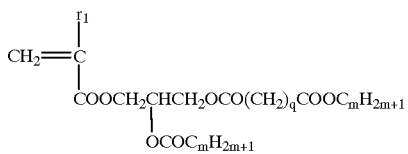
(12)

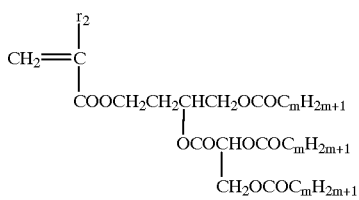
(13)

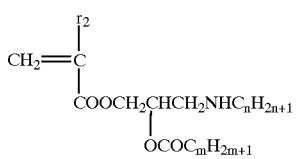
(14)

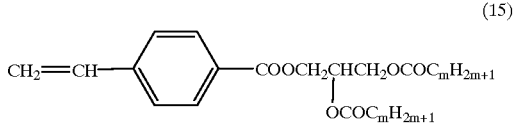
(15)

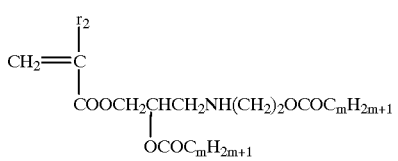
(16)

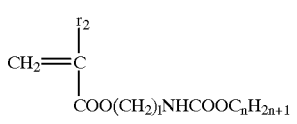
(17)

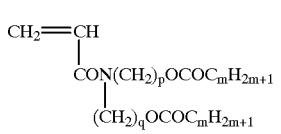
(18)

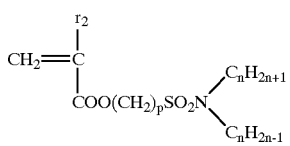
(19)

The dispersed resin according to the first embodiment of the present invention comprises at least one monomer (A) and at least one monomer (C), and it is important that the resin synthesized from these monomers is insoluble in an nonaqueous solvent, thereby being able to obtain the desired dispersed resin.

The total amounts of the monomer (A) and the monomer (C) are preferably 10 parts to 100 parts by weight, more preferably 10 parts to 80 parts by weight, based on 100 parts by weight of the nonaqueous solvent. More specifically, the monomer (C) represented by formula (II-A) is used preferably in an amount of 0.1% to 10% by weight, more preferably 0.2% to 8% by weight, based on the monomer (A) to be insolubilized.

In the first preferred embodiment of the present invention, the resin for dispersion stabilization is preferably 1 to 25 parts by weight, more preferably 5 to 20 parts by weight, based on 100 parts by weight of the above total monomers.

Then, the monofunctional macromonomers (MA) for use in the second preferred embodiment of the present invention are further described.

The monofunctional macromonomer (MA) is a macromonomer having a weight average molecular weight of $2 \times 10^4$ or less, preferably $1 \times 10^3$ to $2 \times 10^4$, in which a polymerizable double bond group represented by formula (IV-B) is combined with only one end of a main chain of a polymer comprising repeating-units represented by formula (II-B).

In formulas (II-B) and (IV-B), hydrocarbon groups contained in $a^{11}$, $a^{12}$, $V^0$, $D^0$, $b^{11}$ and $b^{12}$ each has carbon atoms shown (as an unsubstituted hydrocarbon group), but they may be substituted with a halogen atom, an acyl group, an amino group, a cyano group, an alkyl group having 1 to 5 carbon atoms, an alkoxy group, an aryl group which may be substituted with an alkyl or haloalkyl group, or an amido group.

In formula (II-B), $D^{11}$ in the substituent group represented by $V^0$ represents a hydrocarbon atom, as well as a hydrogen atom. Preferred examples of the hydrocarbon groups include alkyl groups having 1 to 22 carbon atoms which may be substituted (e.g., methyl, ethyl, propyl, butyl, heptyl, hexyl, octyl, nonyl, decyl, tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethyl, 3-bromopropyl), alkenyl groups having 4 to 18 carbon atoms which may be substituted (e.g., 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl, linoleyl), aralkyl groups having 7 to 12 carbon atoms which may be substituted (e.g., benzyl, phenetyl, 3-phenylpropyl, naphthylmethyl, 2-naphthylethyl, chlorobenzyl, bromobenzyl, -methylbenzyl, ethylbenzyl, methoxybenzyl, dimethylbenzyl, dimethoxybenzyl), alicyclic groups having 5 to 8 carbon atoms which may be substituted (e.g., cyclohexyl, 2-cyclohexylethyl, 2-cyclopentylethyl), and aromatic groups having 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, dodecyloylamidophenyl).

When $V^0$ represents —Ph— (a phenylene group), a benzene ring may have a substituent group. The substituent groups include halogen atoms (for example, chlorine and bromine) and alkyl groups (for example, methyl, ethyl, propyl, butyl, chloromethyl and methoxymethyl).

$a^{11}$ and $a^{12}$ are the same or different and each preferably represents a hydrogen atom, a halogen atom (for example, chlorine or bromine), a cyano group, an alkyl group having 1 to 3 carbon atoms (for example, methyl, ethyl or propyl), —COO—$D^{13}$ or —$CH_2COO$—$D^{13}$ (wherein $D^{13}$ represents a hydrogen atom or an alkyl, alkenyl, aralkyl, alicyclic or aryl group having 1 to 18 carbon atoms, which may be substituted, and specific examples thereof are the same as those described for $D^{11}$ above).

When $D^0$ represents a hydrocarbon group having 8 to 22 carbon atoms, specific examples thereof are the same as those described for $D^{11}$ mentioned above.

The case where $D^0$ represents a substituent having a total number of atoms of 8 or more (excluding a hydrogen atom directly attached to a carbon or nitrogen atom) represented by formula (III-B) is described in detail.

$A^{11}$ and $A^{12}$ each represents at least one group selected from a group represented by formula (III-Ba) and a hydrocarbon group having 1 to 18 carbon atoms (examples of the hydrocarbon group include an alkyl group, an alkenyl group, an aralkyl group and an alicyclic group, and specific examples thereof include those described as $D^{11}$) (in the case of two or more, each represents a bond of the group of formula (III-Ba) and/or the hydrocarbon group).

More specifically, examples of $A^{11}$ and $A^{12}$ include any combinations of atomic groups such as —$C(D^{31})(D^{32})$— (in which $D^{31}$ and $D^{32}$ each represents a hydrogen atom, an alkyl group or a halogen atom), —(CH=CH)—, a phenylene group (—Ph—), a cyclohexylene group and the group represented by formula (III-Ba).

When $D^0$ represents the substituent having a total number of atoms of 8 or more represented by formula (III-Ba) it is preferred that a "binding main chain" composed of $V^0$ to $D^{21}$ (namely, $V^0$, $A^{11}$, $B^{11}$, $A^{12}$, $B^{12}$ and $D^{21}$) in a binding group (—$V^0$—($A^{11}$—$B^{11}$)$_{m0}$—($A^{12}$—$B^{12}$)$_{n0}$—$D^{21}$) in formula (III-B) has a total number of atoms constituting the binding main chain of 8 or more. The number of atoms constituting the binding main chain is counted in the same manner as described above in formula (III-A).

In the repeating unit represented by formula (II-B) as described above, specific examples in the case where $D^0$ represents the substituent shown by formula (III-B) include repeating units represented by the above-described formulas (1) to (19).

The macromonomer (MA) used in the present invention has a chemical structure in which a polymerizable double bond group represented by formula (IV-B) is combined with only one end of a main chain of a polymer comprising repeating units corresponding to a monomer represented by formula (II-B), directly or through any binding group.

In formula (IV-B), $V^1$ represents —COO—, —CONHCOO—, —CONHCONH—, —CONH— or a phenylene group.

Here, specific examples of the phenylene groups are the same as those of the phenylene groups for $V^0$ in formula (II-B).

$b^{11}$ and $b^{12}$ are the same or different and each has the same meaning as $a^{11}$ and $a^{12}$ in formula (II-B), and examples thereof are the same as those of $a^{11}$ and $a^{12}$.

It is more preferred that either of $b^{11}$ and $b^{12}$ in formula (IV-B) is a hydrogen atom.

A group connecting a component of formula (II-B) to a component of formula (IV-B) is constituted by any combination of atomic groups of a carbon-carbon bond (single bond or double bond), a carbon-heteroatom bond (examples of the heteroatoms include an oxygen atom, a sulfur atom, a nitrogen atom and silicon atom) and a heteroatom-heteroatom bond.

Of the macromonomers (MA) of the present invention, preferred are ones represented by the following formula (VII-B):

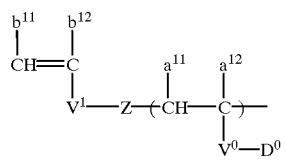
(VII-B)

wherein symbols other than Z have the same meanings as given for those in formulas (II-B) and (IV-B).

Z represents a single bond, or an independent binding group selected from atomic groups such as —$C(D^{41})(D^{42})$— (in which $D^{41}$ and $D^{42}$ each independently represents a hydrogen atom, a halogen atom (e.g., fluorine, chlorine, bromine), a cyano group, a hydroxyl group, an alkyl group (e.g., methyl, ethyl, propyl)), —(CH=CH)—, —$C_6H_{10}$— (a cyclohexylene group), —Ph— (a phenylene group), —O—, —S—, —CO—, —N($D^{43}$)—, —COO—, —SO—, —CON($D^{43}$)—, —SON($D^{43}$)—, —NHCOO—, —NHCONH—, —Si($D^{43}$)($D^{44}$)— (in which $D^{43}$ and $D^{44}$ each independently represents a hydrogen atom or a hydrocarbon group having the same meaning as given for D described above) and an independent binding group shown in groups shown below, or a binding group constituted by any combination thereof.

In formula (VII-B), particularly preferred examples of $a^{11}$, $a^{12}$, $b^{11}$, $b^{12}$, $V^0$ and $V^1$ are each shown below.

$V^0$ includes —COO—, —OCO—, —O—, —$CH_2$COO— and —$CH_2$OCO—, $V^1$ includes all the groups described above, and $a^{11}$, $a^{12}$, $b^{11}$ and $b^{12}$ include a hydrogen atom and a methyl group.

Specific examples of moieties represented by the following formula (V'-B) in formula (VII-B) are shown below, but it is to be understood that the present invention is not limited thereto:

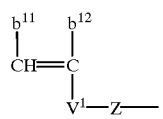
(V'-B)

In the following, b represents —H or —$CH_3$; $m^1$ represents an integer of 1 to 12; and $n^1$ represents an integer of 2 to 12.

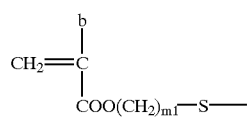
(V'-1)

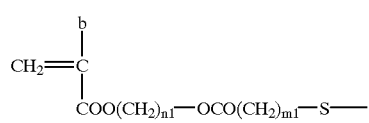
(V'-2)

(V'-3)
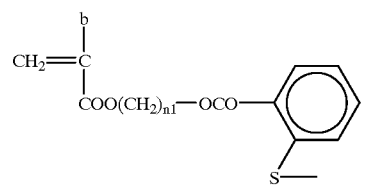
(V'-4)
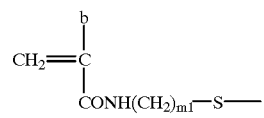
(V'-5)
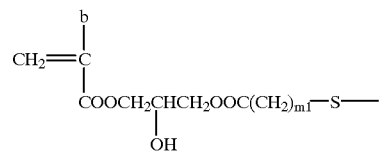
(V'-6)
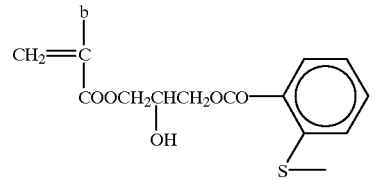
(V'-7)
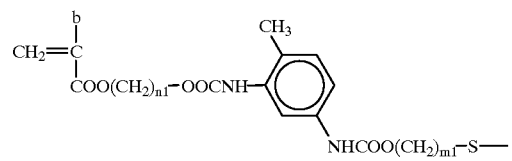
(V'-8)
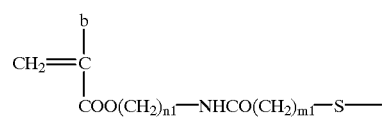
(V'-9)
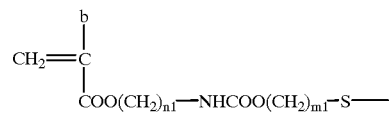
(V'-10)
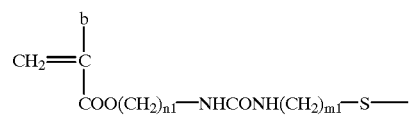
(V'-11)
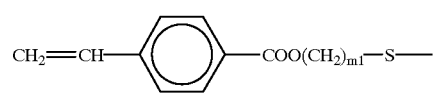
(V'-12)
(V'-13)
(V'-14)
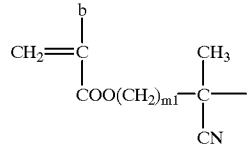
(V'-15)
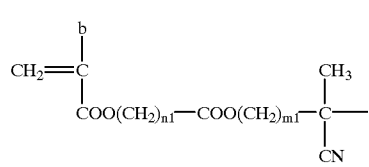
(V'-16)
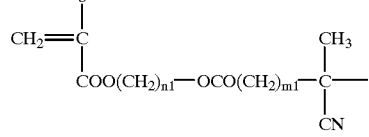
(V'-17)
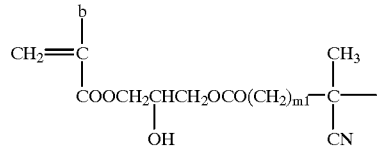
(V'-18)
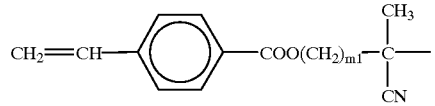
(V'-19)
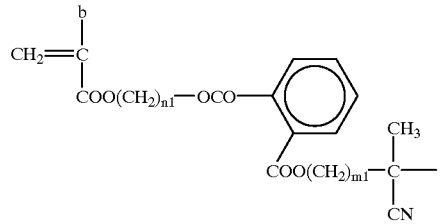
(V'-20)
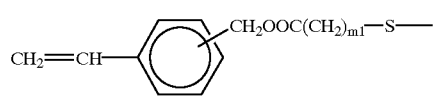
(V'-21)
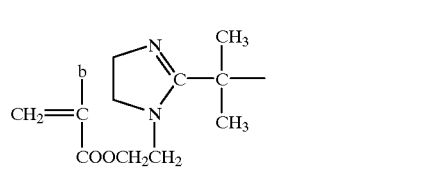

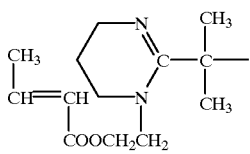

(V'-22)

Furthermore, in polymerization components of the macromonomers (MA) used in the present invention, other repeating units may be contained as copolymerization components together with the repeating units corresponding to the monomers represented by formula (II-B).

The other copolymerization components may be any compounds, as long as they are monomers copolymerizable with the monomers corresponding to the repeating units of formula (II-B). Examples thereof include unsaturated carboxylic acids such as acrylic acid, methacrylic acid, itaconic acid, crotonic acid, maleic acid, vinylacetic acid and 4-pentenoic acid, esters and amides of these unsaturated carboxylic acids, vinyl esters and allyl esters of fatty acids having 1 to 22 carbon atoms, vinyl ethers, styrene and styrene derivatives and heterocyclic compounds containing unsaturated binding groups.

Specific examples thereof include but are not limited to the compounds shown as examples in the above-mentioned monomers (A).

In the total amount of the repeating units of the macromonomer (MA), a component of the repeating units corresponding to the monomer represented by formula (I-B) is contained preferably in an amount of 60% by weight or more of the total, and more preferably in an amount of 80% to 100% by weight.

The macromonomer (MA) of the present invention has a weight average molecular weight of $1 \times 10^3$ to $2 \times 10^4$, preferably $3 \times 10^3$ to $1.5 \times 10^4$.

Within each specified range described above, the dispersed resin particles show the effects in dispersion stability, redispersion stability and storage stability.

The macromonomers (MA) of the present invention can be produced by known synthesis methods. Examples thereof include (1) a method by ionic polymerization in which various reagents are allowed to react on terminals of living polymers to form macromonomers; (2) a method by radical polymerization in which various reagents are allowed to react with terminal reactive group-binding oligomers obtained by radical polymerization using polymerization initiators and/or chain transfer agents containing reactive groups such as carboxyl, hydroxyl and amino groups in their molecules, thereby forming macromonomers; and (3) a method by polyaddition condensation in which polymerizable double bond groups are introduced into oligomers obtained by polyaddition or polycondensation reaction, in the same manner as in the above-mentioned radical polymerization method.

Specifically, they can be synthesized according to methods described in reviews, and literatures and patents cited therein, such as P. Dreyfuss & R. P. Quirk, *Encycl. Polym. Sci. Eng.*, 7:551 (1987), P. F. Rempp & E. Franta, *Adv. Polym. Sci.*, 58:1 (1984), V. Percec, *Appl. Polym. Sci.*, 285:95 (1984), R. Asami & M. Takari, *Makromol, Chem. Suppl.*, 12:163 (1985), P. Rempp et al., *Makromol. Chem. Suppl.*, 8:3 (1984), Yusuke Kawakami, *Kagaku Kogyo*, 38:56 (1987), Yuya Yamashita, *Kobunshi*, 31:988 (1982), Shiro Kobayashi, *Kobunshi*, 30:625 (1981), Toshinobu Higashimura, *Nippon SetchakuKyokaishi*, 18:536 (1982), Koichi Ito, *Kobunshi Kako*, 35:262 (1986) and Kishiro Azuma & Takashi Tsuda, *Kino Zairyo*, 10:5 (1987).

Examples of the above-mentioned polymerization initiators containing reactive groups in their molecules include those described above.

Furthermore, examples of the chain transfer agents containing specific reactive groups in their molecules include those described above.

The amounts of these chain transfer agents and the polymerization initiators used in this embodiment are each preferably 0.5 to 20 parts by weight, and more preferably 1 to 10 parts by weight, based on 100 parts by weight of the total monomers.

The dispersed resin according to the second embodiment of the present invention comprises at least one monomer (A) and at least one monofunctional macromonomer (MA) It is important that the resin synthesized from these monomer is insoluble in a nonaqueous solvent, whereby the desired dispersed resin can be obtained. More specifically, the monofunctional macromonomer (MA) is used preferably in an amount of 0.1% to 20% by weight, and more preferably 0.3% to 15% by weight, based on the monomer (A) to be insolubilized.

The total amounts of the monomer (A) and the macromonomer (MA) are preferably 10 parts to 100 parts by weight, more preferably 10 parts to 80 parts by weight, based on 100 parts by weight of the nonaqueous solvent.

In the second preferred embodiment of the present invention, the resin for dispersion stabilization is preferably 3 to 50 parts by weight, more preferably 5 to 25 parts by weight, based on 100 parts by weight of the above total monomers.

The dispersed resin particles used in the present invention are generally produced by heat polymerization of the resins for dispersion stabilization (P), the monomers (A) and the monomers (C) or macromonomers (MA) as described above in the nonaqueous solvents in the presence of polymerization initiators such as benzoyl peroxide, bisazoisobutyronitrile and butyllithium. Specifically, there are (1) a method of adding the polymerization initiator to a mixed solution of the resin for dispersion stabilization (P), the monomer (A) and the monomer (C) or macromonomer (MA), (2) a method of adding dropwise the monomer (A) and the monomer (C) or macromonomer (MA) together with the polymerization initiator to a solution in which the resin for dispersion stabilization (P) is dissolved, (3) a method of arbitrarily adding the polymerization initiator and the remainders of the monomer (A) and the monomer (C) or macromonomer (MA) to a mixed solution containing the total amount of the resin for dispersion stabilization (P) and parts of the monomer (A) and the monomer (C) or macromonomer (MA), and (4) a method of arbitrarily adding a mixed solution of the resin for dispersion stabilization (P), the monomer (A) and the monomer (C) or macromonomer (MA) to the nonaqueous solvent together with the polymerization initiator. The dispersed resin particles can be produced using any of these methods.

The amount of the polymerization initiator is suitably 0.1% to 10% by weight based on the total monomers. The polymerization temperature is preferably about 40° C. to about 180° C., and more preferably 50° C. to 120° C. The reaction time is preferably 3 hours to 15 hours.

When the above-mentioned polar solvents, such as alcohols, ketones, ethers and esters, are used in combination with the nonaqueous solvents used in the reaction, or when unreacted monomers of the monomers (A) and the monomers (C) or macromonomers (MA) to be subjected to polymerization granulation remain, it is preferred that the polar solvents or the unreacted monomers are removed by distillation under heating to temperatures equal to or higher than boiling points of the solvents or the monomers, or under reduced pressure.

The nonaqueous dispersed resin particles produced according to the present invention as described above are present as particles which are fine and uniform in particle size distribution. The mean particle size thereof is 0.08 μm to 0.8 μm, more preferably 0.1 μm to 0.5 μm, and most preferably 0.1 μm to 0.4 μm. This particle size can be determined with CAPA-500 (trade name, manufactured by Horiba, Ltd.).

The resins for dispersion stabilization (P) used in the present invention are soluble in organic solvents, and specifically, they are preferably dissolved in an amount of at least 5 parts by weight based on 100 parts by weight of toluene solvent at a temperature of 25° C.

The weight average molecular weight of the dispersed resin of the present invention is preferably $5 \times 10^3$ to $1 \times 10^6$, more preferably $1 \times 10^3$ to $1 \times 10^6$, still more preferably $8 \times 10^3$ to $5 \times 10^5$, and most preferably $3 \times 10^4$ to $5 \times 10^5$.

As to thermal properties, the dispersed resin of the present invention has preferably a glass transition point ranging from 15° C. to 80° C. or a softening point of 35° C. to 120° C., preferably a glass transition point ranging from 20° C. to 60° C. or a softening point of 38° C. to 90° C., and most preferably a glass transition point ranging from 20° C. to 60° C. or a softening point of 40° C. to 90° C.

Within the ranges as described above, the dispersed resin particles of the oil-based ink of the present invention are excellent in dispersion stability, redispersion stability and storage stability, the rapid fixing property after image formation is good, images are retained also in printing, and the high press life is exhibited.

At the same time, they show very stable dispersibility, and particularly, even when repeatedly used in a recording device for a long period of time, they are good in dispersibility and easily redispersed, so that contamination due to adhesion of the resin particles to each part of the device is not observed at all.

Furthermore, the rapid treatment by heating after ink image formation easily forms a strong coating on a surface of a support for a lithographic printing plate, thereby exhibiting the good fixing property. This makes it possible to print a large number of sheets (high press life) also in offset printing.

The oil-based ink of the present invention bringing about the effects as described above becomes available according to the insoluble latexes of the present invention.

In the dispersed resin particles of the present invention, the resin for dispersion stabilization (P) is chemically bonded to the insoluble resin particles at the time of polymerization granulation. The resin (P) to which the resin particles are bonded is soluble in the nonaqueous solvent, which brings about a so-called steric repulsion effect. At the same time, the resin (P) is a soluble resin containing the crosslinked structure, so that the affinity for the nonaqueous solvent is extremely improved, and the resin (P) adsorbed exists in the vicinity of the particle interface, because it has the crosslinked structure. It is presumed that these improve the affinity for the solvent in the vicinity of the particle interface.

From these, it is considered that coagulation and precipitation of the insoluble particles are inhibited, thereby significantly improving the redispersibility.

Further, the insoluble resin particles of the present invention obtained by polymerization granulation using the monomer (C) having the specific substituent group in combination is more imposed in the monodispersibility and redispersibility of the particles by polymerization granulation using the resin for dispersion stabilization (P) of the present invention. That is, the monomer (C) copolymerizes with the monomer (A) insolubilized at the time of polymerization granulation. However, the specific substituent group moiety contained in the monomer (C) is established so as to improve the affinity for the nonaqueous solvent, because it forms particles by nonaqueous dispersion polymerization. It is therefore orientated in the interface (surface) area of the particle structure rather than it gets into the inside of the particle structure, because of its good solvent affinity for the dispersion medium. It is presumed that as a result, the affinity for the dispersion medium on the particle surface is improved together with the resin for dispersion stabilization (P) to significantly enhance the effect of preventing coagulation between the particles.

The dispersed resin particles of the present invention are considered to be caused by the presence of a soluble component contained in the macromonomer (MA) in the particle interface of the insolubilized and dispersed resin, which brings about some kind of improvement on the particle surface to improve the affinity for a dispersing medium and increase the solvation with the dispersing medium, resulting in prevention of coagulation of the resin particles.

As described above, the use of the resins for dispersion stabilization (P) of the present invention improves the dispersion stability, and the resins are condensed in the oil-based ink when the ink is repeatedly used for a long period of time, thereby improving the fear of raising various problems.

It is preferred that the oil-based ink used in the present invention contains coloring materials as coloring components for detecting printing plates after processing, together with the above-mentioned dispersed resin particles.

As the coloring materials, any can be used as long as they are pigments and dyes previously used in oil-based ink compositions or liquid developers for electrostatic photography.

As the pigments, ones generally used in the technical field of printing can be used, regardless of inorganic pigments or organic pigments. Specifically, known pigments can be used without particular limitation, such as carbon black, cadmium red, molybdenum red, Chrome Yellow, cadmium yellow, Titan Yellow, chromium oxide, pyridian, Titan Cobalt Green, ultramarine blue, Prussian blue, cobalt blue, azo pigments, phthalocyanine pigments, quinacridone pigments, isoindolinone pigments, dioxazine pigments, threne pigments, perylene pigments, perynone pigments, thioindigo pigments, quinophthalone pigments and metal complex pigments.

Preferred examples of the dyes include oil-soluble dyes such as azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metallophthalocyanine dyes.

These pigments and dyes may be used alone or can be used appropriately in combination. They are preferably contained within the range of 0.01% to 5% by weight based on the whole ink.

These coloring materials may be dispersed by themselves in the nonaqueous solvents as dispersed particles, separately from the dispersed resin particles, or allowed to be contained in the dispersed resin particles. When they are allowed to be contained in the dispersed resin particles, the pigments are generally coated with resin materials of the dispersed resin particles to form resin-coated particles, and for the dyes, surface portions of the dispersed resin particles are generally colored therewith to form colored particles.

As one of the methods, there is a method described in JP-A-57-48738 in which a dispersed resin is dyed with a preferable dye. As another method, there is a method described in JP-A-53-54029 in which a dispersed resin is allowed to chemically combine with a dye, or a method described in JP-B-44-22955 (the term "JP-B" as used herein means an "examined Japanese patent publication") in which a monomer previously containing a dye is used in the production by polymerization granulation to form a dye-containing copolymer.

The dispersed resin particles and the colored particles (or coloring material particles) contained in the oil-based ink of the present invention are electrically detectable particles positively or negatively charged.

It is attainable to impart the electric detecting property to these particles by appropriately utilizing the technology of developers for wet electrostatic photography. Specifically, it is carried out by using electric detecting materials described in "Recent Developments and Utilization of Electrophotographic Development Systems and Toner Materials", pages 139 to 148, "Fundamental and Application of Electrophotographic Techniques", edited by Denshi Shashin Gakkai, pages 497 to 505 (Corona, 1988), and Yuji Harazaki, "Electro-photography", 16 (No. 2), 44 (1977), and other additives.

Specifically, it is described, for example, in British Patents 893,429 and 934,038, U.S. Pat. Nos. 1,122,397, 3,900,412 and 4,606,989, JP-B-4-51023, JP-B-6-19595, JP-B-6-19596, JP-B-6-23865, JP-A-60-185963 and JP-A-2-13965.

Charge regulating agents are preferably added in an amount of 0.001 part to 1.0 part by weight based on 1000 parts by weight of dispersing medium or carrier liquid. Various additives may be further added if desired, and the upper limit of the total amount of these additives is restricted by the electric resistance of the oil-based ink. That is, if the electric resistance of the ink with the dispersed particles removed is lower than $10^9$ Ωcm, it becomes difficult to obtain continuous tone images of good quality. It is therefore necessary to control the amount of each additive added within this limit.

The lithographic printing plate precursors for use in the present invention are described below.

The image receiving layer in this case comprises zinc oxide and a binding resin, and the degree of the hydrophobicity of a surface thereof is 50° or more in the contact angle with water. Considering the ink-receptivity, the contact angle with water is preferably 50° to 130°, more preferably 50° to 120°, and most preferably 55° to 110°.

When the contact angle with water is within the above-mentioned range, the strength of the image layer as described above is sufficiently maintained, and clear images are formed in which no distortion of thin-line, thin-letter and halftone dot images is developed.

The contact angle is a value measured by the liquid-drop method using distilled water with a contact angle meter.

In contrast, a technique disclosed in JP-A-54-117203 uses an ink jet process employing an oil-based ink, similarly to the present invention. Different from the present invention, however, a surface of an image receiving layer of a lithographic printing plate precursor, and the contact angle with water is 40° or less. Such a technique is significantly poor in image reproducibility and also greatly reduced in press life, compared with the present invention.

In the present invention, the smoothness of the surface of the image receiving layer is preferably 30 (second/10 ml), and more preferably 45 to 300 (second/10 ml), by the Beck smoothness.

When the smoothness of the surface of the image receiving layer is within the range described above, clear images developing no defects in images are formed, the adhesive quality between an image area and the image receiving layer is also improved by the effect of increasing the adhered area, and the press life is remarkably improved to 3000 sheets or more.

Here, the Beck smoothness can be measured with a Beck smoothness tester. The Beck smoothness tester is a tester for measuring a time required for a definite amount (100 ml) of air to pass through between a test piece and a glass surface under reduced pressure, wherein the test piece is pressed to a highly smoothly finished circular glass plate having a hole at its center at a definite pressure (1 kg/cm$^2$).

Furthermore, the methods for preparing processing printing plates of the present invention are described.

First, the lithographic printing plate precursor used in the present invention is described which comprises a water-resistant support having provided thereon an image receiving layer containing at least zinc oxide and a binding resin.

Zinc oxide used in the present invention may be any of products commercially available as zinc oxide, zinc white and wet zinc white, as described, for example, in "Newly-Edited Pigment Handbook", edited by Nippon Ganryo Gijutsu Kyokai Seibundo (1968).

That is, zinc oxide is produced by a method called the French method (indirect method) or the American method (direct method) as the dry method, or the wet method, according to its starting raw material and manufacturing method. Examples thereof include products commercially available from Seido Kagaku Co., Ltd., Sakai Chemical Industry Co., Ltd., Hakusui Kagaku Co., Ltd., Honjo Chemical Co., Ltd., Toho Zinc Co., Ltd. and Mitsui Mining & Smelting Co., Ltd.

The amount of zinc oxide contained in the image receiving layer is preferably 10% to 25% by weight, and more preferably 12% to 22% by weight.

Such an amount of zinc oxide contained improves the effect of the present invention. In contrast, if the amount of zinc oxide is decreased, hydrophilization of the surface of the image receiving layer by a desensitizing treatment becomes insufficient, resulting in failure to obtain the actual effect of the present invention. On the other hand, if the amount is increased too much, the amount of the binding resin required can unfavorably not be ensured.

The binding resin used in the image receiving layer of the present invention is a hydrophobic resin constituting the image receiving layer together with zinc oxide and giving a contact angle within the above-mentioned specific range to the surface thereof, as described above. The molecular weight of the resin is preferably $10^3$ to $10^5$, and more preferably $5\times10^3$ to $5\times10^5$, by the weight average molecular weight. Furthermore, the glass transition point of this resin is preferably 0° C. to 120° C., and more preferably 10° C. to 90° C.

Specific examples of such resins include vinyl chloride-vinyl acetate copolymers, styrene-butadiene copolymers, styrene-methacrylate copolymers, methacrylate copolymers, acrylate copolymers, vinyl acetate copolymers, polyvinyl butyral, alkyd resins, epoxy resins, epoxy ester resins, polyester resins and polyurethane resins.

These resins may be used alone or as a combination of two or more of them.

The amount of the resin contained in the image receiving layer is preferably 9/91 to 20/80 by the weight ratio of the resin/zinc oxide.

The image receiving layer of the present invention may contain other constituting components together with the above-mentioned components.

As the other components which may be contained, there are inorganic pigments other than zinc oxide used in the present invention. Such inorganic pigments include, for example, kaolin clay, calcium carbonate, barium carbonate, calcium sulfate, barium sulfate, magnesium carbonate, titanium oxide, silica and alumina. When these other inorganic pigments are used in combination with zinc oxide, they can be used in an amount not exceeding 20 parts by weight based on zinc oxide used in the present invention.

Furthermore, in order to improve desensitizing of the image receiving layers, they may contain resin particles such as acrylic resin particles containing specific functional groups described in JP-A-4-201387, JP-A-4-223196, JP-A-4-319491, JP-A-5-58071, JP-A-4-353495 and JP-A-5-119545. These resin particles are usually spherical, and the average particle size thereof is preferably 0.1 $\mu$m to 2 $\mu$m.

The use of these other inorganic pigments or the resin particles within the above-mentioned ranges sufficiently desensitizes (hydrophilizes) non-image areas by a desensitizing treatment, inhibits ground stains of printed matter, sufficiently adheres image areas to the image receiving layers, and can provide sufficient press life without development of defects of images even when the number of printed sheets is increased.

The ratio of pigment (including zinc oxide)/binding resin contained in the image receiving layer is generally 10 parts to 25 parts by weight of binding resin, and preferably 13 parts to 22 parts by weight of binding resin, based on 100 parts of pigment. Within this range, the effects of the present invention is efficiently exhibited, and the membrane strength is retained in printing or the high hydrophilicity is maintained in desensitizing.

In addition, crosslinking agents may be added to the image receiving layers for enhancing the membrane strength.

The crosslinking agents include compounds usually used as crosslinking agents. Specifically, compounds described in "Crosslinking Agent Handbook", edited by Shinzo Yamashita and Tosuke Kaneko, Taiseisha (1981) and "Polymer Data Handbook, Fundamental Volume", edited by Kobunshi Gakkai, Baifukan (1986) can be used.

In the present invention, reaction accelerators may be used as so required, for accelerating crosslinking reactions in the image receiving layers.

When the crosslinking reaction is a reaction mode of forming chemical bonds between functional groups, the reaction accelerators include, for example, organic acids (e.g., acetic acid, propionic acid, butyric acid, benzenesulfonic acid, p-toluenesulfonic acid), phenols (e.g., phenol, chlorophenol, nitrophenol, cyanophenol, bromophenol, naphthol, dichlorophenol), organic metal compounds (e.g., acetylacetonato zirconium salt, acetylacetone zirconium salt, acetylacetone cobalt salt, dibutoxytin dilaurate), dithiocarbamic acid compounds (e.g., diethyl dithiocarbamate), thinouram disulfide compounds (e.g., tetramethylthinouram disulfide), carboxylic anhydrides (e.g., phthalic anhydride, maleic anhydride, succinic anhydride, butylsuccinic anhydride, 3,3',4,4'-tetracarboxylic acid benzophenone dianhydride, trimellitic anhydride). When the crosslinking reaction is a polymerization reaction mode, polymerization initiators are used. Examples thereof include peroxides and bisazo compounds.

The binding resins are preferably hardened by light and/or heat after coating of compositions for the image receiving layers. In order to conduct heat hardening, for example, severer drying conditions are employed than those in preparing the conventional image receiving layers. For example, it is preferred that drying is performed at a higher temperature and/or for a longer time, or that heat treatment is further conducted after drying of a coated solvent. For example, treatment is conducted at 60° C. to 150° C. for 5 minutes to 120 minutes. The use of the above-mentioned reaction accelerators in combination makes it possible to treat under milder conditions.

Furthermore, specific functional groups in the resins may be hardened by light. As the method of hardening by light irradiation, a process of light irradiation with chemical active light rays may be introduced. The chemical active light rays may be any of visible light rays, ultraviolet rays, far ultraviolet rays, electron rays, X-rays, $\gamma$-rays and $\alpha$-rays. However, ultraviolet rays are preferred, and light rays having a wavelength ranging from 310 nm to 500 nm are more preferred. In general, a low-pressure, high-pressure or extra-high pressure mercury lamp or halogen lamp is used. The treatment by light irradiation can usually be sufficiently conducted by irradiation from a distance of 5 cm to 50 cm for 10 seconds to 10 minutes.

The thickness of the image receiving layer in the present invention is preferably about 3 g to about 30 g, as the amount of an image receiving composition coated per m$^2$ of precursor (after drying). Furthermore, it is preferred that this image receiving layer has usually a porosity of 3% to 50% by volume, and preferably about 10% to about 40% by volume.

The image receiving layer of the present invention is provided on the water-resistant support. As the water-resistant support, paper subjected to a water-resistant treatment, paper laminated with a plastic film or metal foil, or a plastic film can be used.

As to the support used in the present invention, the smoothness of a surface on the side adjacent to the image receiving layer is preferably adjusted to 300 (second/10 ml) or more, more preferably 900 (second/10 ml) to 3000 (second/10 ml), and most preferably 1000 (second/10 ml) to 3000 (second/10 ml), by the Beck smoothness.

The image reproducibility and the press life can be further improved by restricting the smoothness of the surface on the side adjacent to the image receiving layer of the support to 300 (second/10 ml) or more by the Beck smoothness. Such an improving effect is obtained even if the smoothness of the surface of the image receiving layer is the same, and it is considered that an increase in the smoothness of the surface of the support has improved the adhesive quality between the image area and the image receiving layer.

The highly smooth surface of the water-resistant support thus restricted means a surface directly coated with the image receiving layer. For example, when an under layer or an overcoat layer described later is provided on the support, it means a surface of the under layer or the overcoat layer.

The image receiving layer whose surface state is adjusted as described above without the influence of unevenness of the surface of the support is sufficiently maintained thereby, which makes it possible to further improve the image quality.

As methods for establishing the smoothness within the above-mentioned range, various known methods can be used. Specifically, such methods include a method of melt-adhering a resin to a surface of a substrate, and a method of adjusting the Beck smoothness of a surface of a support by calendering with a highly smooth hot roller.

As the above-mentioned method of melt-adhering the resin, coating by extrusion lamination is preferred in the present invention. The support adjusted to a desired smoothness can be produced by coating by this extrusion lamination. The extrusion lamination is a method in which a resin is melted into a film, which is immediately pressed to base paper, followed by cooling, thus laminating the base paper with the film, and various apparatuses are known.

The thickness of the resin layer thus laminated is 10 μm or more in terms of production stability, and preferably 10 μm to 30 μm.

Furthermore, in the present invention, the under layer can be provided between the support and the image receiving layer for improving the water resistance and the interlayer adhesive quality as described above, and a backcoat layer (back surface layer) can be provided on a surface of the support opposite to the image receiving layer for preventing curls. It is preferred that the backcoat layer has a smoothness ranging from 150 (second/10 ml) to 700 (second/10 ml).

When a printing plate is supplied to an offset printer, this allows the printing plate to be accurately set on the printer without the occurrence of deviation or slippage.

When the under layer and the backcoat layer of the support are each adjusted to such a smoothness, it is preferred that the smoothness is controlled by repeating a calender treatment step plural times, for example, by once conducting calender treatment after formation of the image receiving layer and conducting it again after formation of the backcoat layer, or by a combination of the adjustment with respect to compositions of the under layer and the backcoat layer described later, for example, the ratio and the grain size of a pigment, and the adjustment of calender treatment conditions.

As the substrates used in the precursors of the present invention, for example, substrates such as wood pulp paper, synthetic pulp paper, mixed paper of wood pulp and synthetic pulp, nonwoven fabric, plastic films, cloth, metal sheets and composite sheet-like products thereof can be used as such. Furthermore, for obtaining the preferred smoothness and adjusting the water resistance and other characteristics in the present invention, the above-mentioned substrates may be impregnated with hydrophobic resins or coatings comprising water-dispersible or water-soluble resins and pigments, which are used in the under layer or the backcoat layers as described later.

In the present invention, it is preferred that the supports comprising the above-mentioned substrates having provided thereon the under layers and the backcoat layers are used for satisfying printability required for the lithographic printing plate precursors, such as recording characteristics, water resistance and durability, and for adjusting to the desired smoothness as described above. Such under layers and backcoat layers are formed by applying coating solutions containing resins and pigments onto the supports, followed by drying, or laminating the supports. As the resins used herein, various resins are appropriately selected for use. Specifically, the hydrophobic resins include, for example, acrylic resins, vinyl chloride resins, styrenic resins, styrene-butadiene resins, styrene-acrylic resins, urethane resins, vinylidene chloride resins and vinyl acetate resins, and the hydrophilic resins include, for example, polyvinyl alcohol resins, cellulose derivatives, starch and derivatives thereof, polyacrylamide resins and styrene-maleic anhydride copolymers.

Furthermore, the pigments include clay, kaolin, talc, diatom earth, calcium carbonate, aluminum hydroxide, magnesium hydroxide, titanium oxide and micas. In order to attain the desired smoothness, these pigments are preferably used by appropriately selecting their grain size. For example, a relatively high smoothness is required in the under layers, so that pigments from which small-sized and large-sized grains are cut off, specifically, having a grain size of about 0.5 μm to about 10 μm are preferably used. The pigments as described above are preferably used at a ratio of 80 parts to 150 parts by weight in the under layers and 80 parts to 200 parts by weight in the backcoat layer based on 100 parts by weight of resin. In order to obtain excellent water resistance, the under layers and the backcoat layers effectively contain water resistance imparting agents such as melamine resins and polyamide epichlorohydrin resins. The above-mentioned grain size can be measured using a scanning electron microscopic (SEM) photograph. When the grain is not spherical, the size is a diameter determined by converting a projected area to a circle.

When the lithographic printing plate precursor of the present invention is prepared, generally, a solution containing components for the under layer is applied onto one side of the support, followed by drying to form the under yer, if necessary, a solution containing components for the backcoat layer is further applied onto the other side of the support, followed by drying to form the backcoat layer, if necessary, and subsequently, a coating solution containing components for the image receiving layer is applied, followed by drying to form the image receiving layer. The amounts of the image receiving layer, the under layer and the backcoat layer coated are each 1 g/m$^2$ to 30 g/m$^2$, and particularly suitably 6 g/m$^2$ to 20 g/m$^2$.

More preferably, the thickness of the water-resistant support provided with the under layer and the backcoat layer ranges from 90 μm to 130 μm, and preferably from 100 μm to 120 μm.

A method for forming an image on the above-mentioned precursor for lithographic printing (hereinafter also referred to as a "master") is described below. As a device system for performing such a method, there is, for example, one shown in FIG. 1.

The device system shown in FIG. 1 comprises an ink jet recording device 1 using an oil-based ink.

As shown in FIG. 1, pattern information of images (graphics or sentences) to be formed on a master 2 is first supplied from an information supply source such as a computer 3 to the ink jet recording device 1 using oil-based ink through a transmittal means such as a path 4. A head for ink jet recording 10 of the recording device 1 stores oil-based ink therein, and sprays fine droplets of the ink on the master 2 according to the above-mentioned information, when the master 2 passes through in the recording device 1. Thereby, the ink adheres to the master 2 according to the above-mentioned pattern.

Thus, the image formation on the master 2 is completed to obtain a processing master (a printing precursor for processing).

Figure 2:
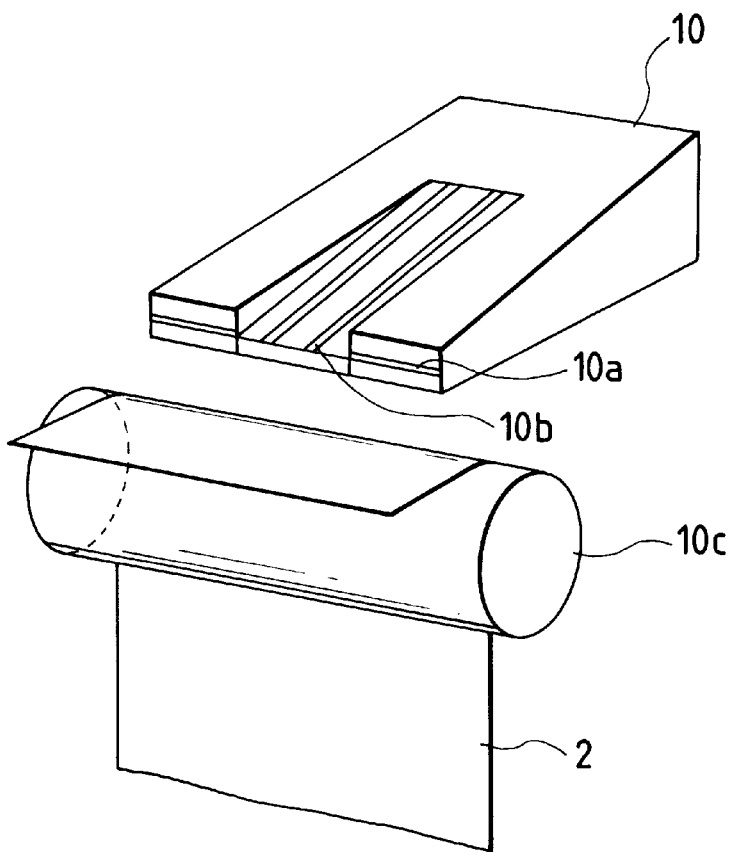
FIG. 2 is a schematic view showing a main part of an ink jet recording device used in the present invention.
Figure 3:
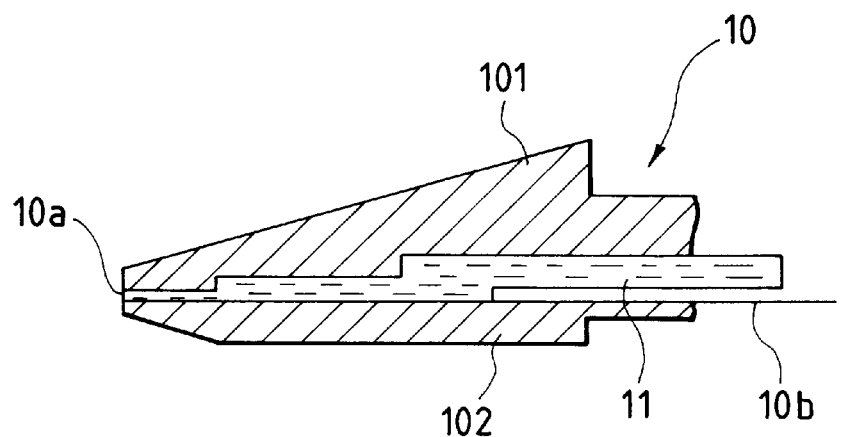
FIG. 3 is a partially sectional view showing a head of the ink jet recording device used in the present invention.

An embodiment of the ink jet recording device as shown in the device system of FIG. 1 is shown in FIG. 2 and FIG. 3. In FIG. 2 and FIG. 3, members common to the members in FIG. 1 are designated by the common reference characters. FIG. 2 is a schematic view showing a main part of such an ink jet recording device, and FIG. 3 is a sectional view showing a part of the head.

The head 10 attached to the ink jet recording device has a slit between an upper unit 101 and a lower unit 102, a leading edge thereof forms a discharge slit 10a, a discharge electrode 10b is disposed in the slit, and the inside of the slit is filled with oil-based ink 11, as shown in FIG. 2 and FIG. 3.

In the head 10, voltage is applied to the discharge electrode 10b according to a digital signal of pattern information of images. As shown in FIG. 2, a counter electrode 10c is provided opposite to the discharge electrode 10b, and the master 2 is placed on the counter electrode 10c. The application of voltage forms a circuit between the discharge electrode 10b and the counter electrode 10c, and the oil-based ink 11 is discharged from the discharge slit 10a of the head 10, thereby forming images on the master 2 placed on the counter electrode 10c.

It is preferred that the width of the discharge electrode 10b is as narrow as possible in its leading edge, for forming images of high quality, for example, conducting printing.

For example, the head of FIG. 3 is filled with oil-based ink, the discharge electrode 10b whose leading edge has a width of 20 μm is used, the distance between the discharge electrode 10b and the counter electrode 10c is adjusted to 1.5 mm, and a voltage of 3 kV is applied between these electrodes for 0.1 millisecond, whereby 40 μm-dot printed letters can be formed on the master 2.

The processing master obtained by forming images on the lithographic printing plate precursor by the ink jet process using oil-based ink as described above is surface treated with a desensitizing treating liquid to desensitize non-image areas, thereby preparing a printing plate.

With respect to desensitization of zinc oxide, as desensitizing treating liquids of this type, there have previously been known cyanic compound-containing treating liquids mainly composed of ferrocyanides or ferricyanides, cyan-free treating liquids mainly composed of ammine complexes, phytic acid and derivatives thereof, or guanidine derivatives, treatment liquids mainly composed of inorganic acids or organic acids forming chelates with zinc ions, and treating liquids containing water-soluble polymers.

Examples of the cyanic compound-containing treating liquids include ones described in JP-B-44-9045, JP-B-46-39403, JP-A-52-76101, JP-A-57-107889 and JP-A-54-117201.

The phytic acid compound-containing treating liquids include ones described in JP-A-53-83807, JP-A-53-83805, JP-A-53-102102, JP-A-53-109701, JP-A-53-127003, JP-A-54-2803 and JP-A-54-44901.

The treatment liquids containing metal complex compounds such as cobalt complexes include ones described in JP-A-53-104301, JP-A-53-140103, JP-A-54-18304 and JP-B-43-28404.

The inorganic or organic acid-containing treating liquids include ones described in JP-B-39-13702, JP-B-40-10308, JP-B-43-28408, JP-B-40-26124 and JP-A-51-118501.

The guanidine compound-containing treating liquids include ones described in JP-A-56-111695.

The water-soluble compound-containing treating liquids include ones described in JP-A-52-126302, JP-A-52-134501, JP-A-53-49506, JP-A-53-59502, JP-A-53-104302, JP-B-38-9665, JP-B-39-22263, JP-B-40-763, JP-B-40-2202 and JP-A-49-36402.

In any of the above-mentioned desensitizing treatments, it is considered that zinc oxide in the surface layer is ionized to a zinc ion, and this ion induces a chelating reaction with a chelate-forming compound in the desensitizing treating liquid to form a zinc chelate, which is deposited in the surface layer to hydrophilize it.

The desensitizing treatment is usually conducted at room temperature (about 15° C. to about 35° C.) for about 2 seconds to about 60 seconds. Using this printing plate and a fountain solution, offset printing is possible for about 10000 sheets.

Production examples of resins for dispersion stabilization, production examples of latex particles and examples of the present invention are shown below to illustrate the affects of the present invention in more detail, but it is to be understood that the present invention is not limited thereto. All parts, weights, ratios and the like are by weight unless otherwise indicated.

PRODUCTION EXAMPLE 1

Resin for Dispersion Stabilization (P-1)

A mixed solution of 100 g of otadecyl methacrylate, 3 g of thioglycolic acid, 5.0 g of divinylbenzene and 200 g of toluene was heated to a temperature of 85° C. with stirring under a steam of nitrogen. Then, 0.8 g of 1,1'-azobis-(cyclohexane-1-carbonitrile) (referred to as "A.C.H.N." simply) was added thereto and allowed to react for 4 hours. Further, 0.4 g of A.C.H.N. was added thereto and allowed to react for 2 hours, and furthermore, 0.2 g of A.C.H.N. was added thereto and allowed to react for 2 hours. After cooling, 10 g of allyl alcohol was added, and the temperature was set to 25° C. To this solution, a mixed solution of 16 g of dicyclohexylcarbodiimide (referred to as "D.C.C." simply), 0.2 g of 4-(N,N-diethylamino)pyridine and 40 g of methylene chloride was added dropwise under stirring for 1 hour. The reaction was further continued as such for 3 hours and completed. Then, 10 g of 80% formic acid was added to this reaction mixture. After stirring for 1 hour, insoluble materials were removed by filtration, and the filtrate was reprecipitated with 2.5 liters of methanol. The precipitate was collected by filtration, and thereafter dissolved in 200 g of toluene again. After insoluble materials were removed by filtration, the filtrate was reprecipitated with 1 liter of methanol. The precipitate was collected by filtration and dried.

The yield of the resulting polymer was 70 g, and the Mw thereof was within the range of $4.5 \times 10^4$ (a value converted to polystyrene by the G.P.C. method, hereinafter the same).

PRODUCTION EXAMPLES 2 TO 10

Resins for Dispersion Stabilization (P-2) to (P-10)

Respective resins for dispersion stabilization were produced in the same manner as in Production Example 1 with the exception that monomers and multifunctional monomers described in Table 1 shown below were each used in place of octadecyl methacrylate and divinylbenzene in Production Example 1.

The Mw of the respective resins (P) was within the range of $4 \times 10^4$ to $6 \times 10^4$.

TABLE 1

| Ex.[1] | Resin | Methacrylate | Polyfunctinal Monomer |
|---|---|---|---|
| 2 | P-2 | Dodecyl methacrylate: 100 g | Allyl methacrylate: 8 g |
| 3 | P-3 | Tridecyl methacrylate: 100 g | Allyl methacrylate: 7 g |
| 4 | P-4 | Dodecyl methacrylate: 80 g | Trivinylbenzene: 1.3 g |
| 5 | P-5 | Octadecyl methacrylate: 100 g | Ethylene glycol dimethacrylate: 5 g |
| 6 | P-6 | Hexadecyl methacrylate: 100 g | Propylene glycol dimethacrylate: 5 g |
| 7 | P-7 | Dodecyl methacrylate: 70 g  Butyl methacrylate: 30 g | Divinyl adipinate: 6 g |

TABLE 1-continued

| Ex.[1] | Resin | Methacrylate | Polyfunctinal Monomer |
|---|---|---|---|
| 8 | P-8 | Octadecyl methacrylate: 90 g<br>Methyl methacrylate: 10 g | Ethylene glycol<br>diacrylate: 4 g |
| 9 | P-9 | Tridecyl methacrylate: 94 g<br>2-Chloroethyl methacrylate: 6 g | Trimethylolpropane<br>trimethacrylate: 1.5 g |
| 10 | P-10 | Tetradeayl methacrylate: 90 g<br>Styrene: 10 g | Divinylbenzene: 4 g |

[1] Production Example

PRODUCTION EXAMPLES 11 TO 14

Resins for Dispersion Stabilization (P-11) to (P-14)

Resins for dispersion stabilization (P) were produced in the same manner as in Production Example 1 with the exception that mercapto compounds described in Table 2 shown below wore each used in place of 3 g of thioglycolic acid in Production Example 1 described above.

TABLE 2

| Ex.[1] | Resin | Mercapto Compound | | Mw |
|---|---|---|---|---|
| 11 | P-11 | HS—C6H4—COOH | 3.0 g | $3.8 \times 10^4$ |
| 12 | P-12 | HSCH$_2$CH$_2$NH(CH$_2$)$_2$COOH | 3.5 g | $4 \times 10^4$ |
| 13 | P-13 | HSCH$_2$CH$_2$NHCO(CH$_2$)$_2$COOH | 4.0 g | $5 \times 10^4$ |
| 14 | P-14 | HSCH$_2$CH$_2$OOC—CH=CH—COOH | 4.0 g | $5.5 \times 10^4$ |

[1] Production Example

PRODUCTION EXAMPLE 15

Resin for Dispersion Stabilization (P-15)

A mixed solution of 100 g of octadecyl methacrylate, 3 g of 2-mercaptoethanol, 4.5 g of divynylbebzene, 150 g of toluene and 50 g of ethanol was heated to a temperature of 60° C. under a steam of nitrogen. Then, 0.5 g of 2,2'-azobisisobutylonitrile (referred to as "A.I.B.N." simply) was added thereto and allowed to react for 5 hours. Then, 0.3 g of A.I.B.N. was added thereto and allowed to react for 3 hours, and further, 0.2 g of A.I.B.N. was added thereto and allowed to react for 3 hours.

Then, this reaction mixture was cooled to 25° C., and 8 g of vinyl acetate was added thereto. A mixed solution of 10 g of D.C.C., 0.4 g of 4-(N,N-diethylamino)pyridine and 30 g of methylene chloride was added dropwise under stirring for 1 hour, followed by further stirring as such for 4 hours. Then, 5 g of a 30% solution of hydrogen chloride in ethanol and 5 g of water was added thereto, followed by stirring as such for 1 hour. The reaction was further continued as such for 3 hours and completed. After insoluble materials were removed by filtration, the filtrate was reprecipitated with 2 liters of methanol. The precipitate was collected by filtration and dried. The Mw of the resulting polymer was $5 \times 10^4$.

PRODUCTION EXAMPLES 16 TO 23

Resins for Dispersion Stabilization (P-16) to (P-23)

Respective resins for dispersion stabilization (P) were produced in the same manner as in Production Example 15 with the exception that polymerizable group-containing carboxylic acid compounds described in Table 3 shown below were each used in place of vinyl acetate in Production Example 15 described above.

The Mw of the respective resulting polymers was about $5 \times 10^4$.

TABLE 3

| Production<br>Example | Resin<br>(P) | Polymerizable Group-Containing<br>Carboxylic Acid Compound |
|---|---|---|
| 16 | P-16 | Methacrylic acid |
| 17 | P-17 | Acrylic acid |
| 18 | P-18 | 2-Carboxyethyl acrylate |
| 19 | P-19 | 4-Vinylbenzenecarboxylic acid |
| 20 | P-20 | α-Chloroacrylic acid |
| 21 | P-21 | $CH_2=C(CN)COO(CH_2)_2OCO(CH_2)_2COOH$ |
| 22 | P-22 | $CH_2=CH\text{-}COO(CH_2)_2OCO(CH_2)_3COOH$ |
| 23 | P-23 | $CH_2=CH\text{-}CONH(CH_2)_{10}COOH$ |

PRODUCTION EXAMPLE 24

Resin for Dispersion Stabilization (P-24)

A mixed solution of 100 g of octadecyl methacrylate, 1.1 g of ethylene glycol diacrylate and 200 g of tetrahydrofuran was heated to a temperature of 70° C. with stirring under a steam of nitrogen. Then, 6 g of 4,4'-azobis(4-cyanopentanol) was added thereto and allowed to react for 5 hours. Further, 1.0 g of the above-mentioned azobis compound was added thereto and allowed to react for 5 hours. This reaction mixture was cooled to a temperature of 20° C. in a water bath, and 3.2 g of pyridine and 1.0 g of 2,2'-methylenebis-(6-t-butyl-p-cresol) were added thereto, followed by stirring. To this mixed solution, 4.2 g of methacrylic acid chloride was added dropwise for 30 minutes, controlling the reaction temperature so as not to exceed 25° C., followed by stirring at a temperature of 20° C. to 25° C. for 4 hours. Then, this reaction product was reprecipitated with a mixed solution of 1.5 liters of methanol/0.5 liter of water. A white powder was collected by filtration and dried. The yield was 82 g, and the Mw was $7.5 \times 10^4$.

PRODUCTION EXAMPLE 101

Latex Particles (D-1)

A mixed solution of 8 g of the resin for dispersion stabilization (P-1), 100 g of vinyl acetate and 330 g of Isoper H was heated to a temperature of 70° C. with stirring under a steam of nitrogen. As a polymerization initiator, 1.0 g of 2,2'-azobis(isovaleronitrile) (referred to as "A.I.V.N." simply) was added thereto and allowed to react for 3 hours. Further, 0.8 g of an initiator, A.I.B.N., was added thereto, followed by heating to a temperature of 80° C. to conduct the reaction for 4 hours. Subsequently, the temperature was elevated to 100° C. and the resulting solution was stirred for 2 hours to remove unreacted vinyl acetate by distillation.

After cooling, the product was passed through a 200-mesh nylon cloth. The resulting white dispersion was a latex having a rate of polymerization of 97% and an average particle size of 0.38 μm. The particle size was measured with a CAPA-500 (manufactured by Horiba, Ltd.) (hereinafter the same).

A part of the above-mentioned white dispersion was centrifuged by use of a centrifuge (the number of revolution: $1\times10^4$ r.p.m., the time of revolution: 1 hour), and resin particles precipitated were collected and dried. The weight average molecular weight (Mw) and the glass transition point (Tg) of the resin particles were measured. As a result, the Mw was $2\times10^5$, and the Tg was 38° C.

PRODUCTION EXAMPLE 102

Latex Particles (D-2)

A mixed solution of 7 g of the resin for dispersion stabilization (P-16) and 177 g of Isoper H was heated to a temperature of 70° C. with stirring under a steam of nitrogen. A mixed solution of 25 g of methyl methacrylate, 75 g of methyl acrylate, 200 g of Isoper G and 1.5 g of A.I.V.N. was added dropwise thereto for 2 hours, and the mixture was stirred as such for 2 hours. Further, 0.8 g of A.I.B.N. was added thereto, and the temperature was elevated to a temperature of 80° C., followed by stirring for 3 hours. After cooling, the product was passed through a 200-mesh nylon cloth. The resulting white dispersion was a latex having a rate of polymerization of 100% and an average particle size of 0.43 μm.

The Mw of the resin particles was $2\times10^5$, and the Tg thereof was 26° C.

PRODUCTION EXAMPLES 103 TO 107

Latex Particles (D-3) to (D-7)

Latex particles were produced in the same manner as in Production Example 102 with the exception that compounds described in Table 4 shown below were each used in place of the resin for dispersion stabilization (P-16) and the monomers (A) (namely, methyl methacrylate and methyl acrylate) used in Production Example 102 of latex particles. The rate of polymerization of the respective resulting latex particles was 95% to 100%, the average particle size was within the range of 0.35 μm to 0.45 μm, and the monodispersibility was also good.

The Mw of the respective resin particles was within the range of $1\times10^5$ to $3\times10^5$.

TABLE 4

| Ex[1)] | Latex (D) | Resin (P) | | Monomer (A) | | Resin Tg |
|---|---|---|---|---|---|---|
| 103 | D-3 | P-12 | 8 g | Vinyl acetate | 95 g | 42° C. |
| | | | | Crotonic acid | 5 g | |
| 104 | D-4 | P-4 | 9 g | Methyl methacrylate | 30 g | 30° C. |
| | | | | Methyl acrylate | 70 g | |
| 105 | D-5 | P-18 | 7 g | Methyl methacrylate | 65 g | 31° C. |
| | | | | Methyl acrylate | 35 g | |
| 106 | D-6 | P-19 | 10 g | Vinyl acetate | 90 g | 43° C. |
| | | | | Styrene | 10 g | |
| 107 | D-7 | P-15 | 7 g | Vinyl acetate | 90 g | 29° C. |
| | | | | Vinyl propionate | 10 g | |

[1)]Production Example

PRODUCTION EXAMPLE 108

Latex Particles (D-8)

A mixed solution of 6 g of the resin for dispersion stabilization (P-14), 99 g of vinyl acetate, 1.0 g of octadecyl methacrylate and 247 g of Isoper H was heated to a temperature of 70° C. with stirring under a steam of nitrogen. As a polymerization initiator, 1.5 g of A.I.V.N. was added thereto and allowed to react for 3 hours. Further, 0.8 g of A.I.B.N. was added thereto, followed by heating to a temperature of 80° C. to conduct the reaction for 4 hours. Subsequently, the temperature was elevated to 100° C. and the resulting solution was stirred for 2 hours to remove unreacted vinyl acetate by distillation. After cooling, the product was passed through a 200-mesh nylon cloth. The resulting white dispersion was a latex having a rate of polymerization of 96% and an average particle size of 0.46 μm.

The Mw of the resin particles was $1\times10^5$, and the Tg thereof was 38° C.

PRODUCTION EXAMPLES 109 TO 115

Latex Particles (D-9) to (D-15)

Latex particles were produced in the same manner as in Production Example 108 with the exception that resins for dispersion stabilization and monomers (C) described in Table 5 shown below were each used in place of the resin for dispersion stabilization (P-14) and octadecyl methacrylate in Production Example 108.

The rate of polymerization of the respective resulting latex particles was 95% to 98%, the average particle size was within the range of 0.40 μm to 0.50 μm, and the monodispersibility was also good.

The Mw of the respective resin particles was within the range of $8\times10^4$ to $2\times10^5$, and the Tg thereof was within the range of 36° C. to 39° C.

TABLE 5

| Ex[1)] | Latex (D) | Resin (P) | | Monomer (C) | |
|---|---|---|---|---|---|
| 109 | D-9 | P-2 | 8 g | Vinyl oleate | 2.5 g |
| 110 | D-10 | P-15 | 10 g | Octadecyl vinyl ether | 3.0 g |

TABLE 5-continued

| Ex[1] | Latex (D) | Resin (P) | | Monomer (C) | |
|---|---|---|---|---|---|
| 111 | D-11 | P-7 | 8 g | $CH_2=C(CH_3)-COO(CH_2)_2OCO(CH_2)_2COOC_6H_{13}$ | 0.8 g |
| 112 | D-12 | P-8 | 10 g | $CH_2=C(CH_3)-COOCH_2CH(OCOC_5H_{11})CH_2OCOC_5H_{11}$ | 0.6 g |
| 113 | D-13 | P-11 | 10 g | $CH_2=CH-COOCH_2CH(OCOCH_3)CH_2COOC_6H_{13}$ | 0.7 g |
| 114 | D-14 | P-19 | 6 g | $CH_2=C-C_6H_4-COOC_{16}H_{33}$ | 1.0 g |
| 115 | D-15 | P-6 | 8 g | $CH_2=C(CH_3)-COOCH_2CH(OCOC_2H_5)CH_2COOC_5H_{11}$ | 0.6 g |

PRODUCTION EXAMPLE 116

Latex Particles (D-16)

A mixed solution of 7 g of the resin for dispersion stabilization (P-18) and 177 g of Isoper H was heated to a temperature of 60° C. with stirring under a steam of nitrogen. A mixed solution of 30 g of methyl methacrylate, 70 g of methyl acrylate, 2 g of octadecyl acrylate, 144 g of Isoper G and 1.0 g of A.I.V.N. was added dropwise thereto for 2 hours, and the mixture was stirred as such for 2 hours. Further, 0.5 g of A.I.V.N. was added thereto, and the temperature was elevated to a temperature of 80° C. to conduct the reaction for 3 hours. After cooling, the product was passed through a 200-mesh nylon cloth. The resulting white dispersion was a latex having a rate of polymerization of 100% and an average particle size of 0.36 μm. The Mw of the resin particles was $3 \times 10^5$, and the Tg thereof was 28° C.

PRODUCTION EXAMPLE 117 TO 125

Latex Particles (D-17) to (D-25)

Latex particles were produced in the same manner as in Production Example 116 with the exception that compounds described in Table 6 shown below were each used in place of the monomers (A) (namely, methyl methacrylate and ethyl acrylate), the monomer (C) (namely, octadecyl acrylate) and the resin for dispersion stabilization (P-18) used in Production Example 116.

The rate of polymerization of the respective resulting latex particles was 98% to 100%, the average particle size was within the range of 0.35 μm to 0.45 μm, and the monodispersibility was also good.

The Mw of the respective resin particles was within the range of $1 \times 10^5$ to $3 \times 10^5$.

TABLE 6

| Production Ex. | Latex Particles (D) | Monomer (A) | | Resin (P) | Monomer (B) | Resin Particles | Tg |
|---|---|---|---|---|---|---|---|
| 117 | D-17 | Methyl methacrylate<br>Ethyl acrylate | 50 g<br>50 g | P-15<br>6 g | $CH_2=CH-CONH(CH_2)_3COOC_{13}H_{27}$ | 1.2 g | 27° C. |
| 118 | D-18 | Methyl methacrylate<br>Methyl acrylate | 25 g<br>75 g | P-20<br>10 g | Octadecyl α-chloroacrylate | 0.6 g | 28° C. |
| 119 | D-19 | Methyl methacrylate<br>Methyl acrylate | 25 g<br>75 g | P-21<br>9 g | Tetradecyl α-cyanoacrylate | 0.5 g | 27° C. |
| 120 | D-20 | Methyl methacrylate<br>Methyl acrylate | 25 g<br>75 g | P-16<br>8 g | $CH_2=CH-COOCH_2CH(OCOCH_3)CH_2NH(CH_2)_2OCOC_8H_{17}$ | 0.4 g | 26° C. |
| 121 | D-21 | Ethyl methacrylate<br>Ethyl acrylate | 45 g<br>55 g | P-22<br>7 g | $CH_2=CH-COO(CH_2)_4SO_2N(C_8H_{17})(C_2H_5)$ | 1.5 g | 25° C. |

TABLE 6-continued

| Production Ex. | Latex Particles (D) | Monomer (A) | | Resin (P) | Monomoer (B) | | Resin Particles Tg |
|---|---|---|---|---|---|---|---|
| 122 | D-22 | Methyl acrylate<br>Methyl methacrylate | 60 g<br>40 g | P-23<br>8 g | Dodecyl acrylate<br>$CH_2\!=\!\underset{\underset{CH_3}{\mid}}{C}\!-\!COO(CH_2)_2OCOCH\!=\!CHCOOC_6H_{13}$ | 0.5 g<br>0.4 g | 28° C. |
| 123 | D-23 | Methyl methacrylate<br>2-Cyanoethyl acrylate<br>Methyl acrylate | 20 g<br>8 g<br>72 g | P-21<br>9 g | $CH_2\!=\!\underset{\underset{Cl}{\mid}}{C}\!-\!COO(CH_2)_2OCO(CH_2)_3COOC_6H_{13}$ | 0.9 g | 30° C. |
| 124 | D-24 | Vinyl acetate<br>Styrene<br>Vinyl propionate | 80 g<br>10 g<br>10 g | P-9<br>8 g | $CH_2\!=\!\underset{\underset{CH_3}{\mid}}{C}\!-\!COO(CH_2)_{10}COOC_4H_9$ | 1.2 g | 34° C. |
| 125 | D-25 | Methyl methacrylate<br>Acrylic acid<br>Methyl acrylate | 20 g<br>5 g<br>75 g | P-24<br>10 g | Docosanyl acrylate | 0.7 g | 32° C. |

PRODUCTION EXAMPLE 126

Latex Particles (D-26) (Comparative Example A)

A white dispersion was synthesized in the same manner as in Production Example 101 with the exception that 8 g of a known resin for dispersion stabilization (RP-1) having the following structure was used in place of 8 g of the resin for dispersion stabilization (P-1) in Production Example 101. Latex particles having a rate of polymerization of 98% and an average particle size of 0.35 μm were obtained. The Mw of the resin particles was $1\times10^5$ and the Tg thereof was 38° C.

Resin for Dispersion Stabilization (RP-1):

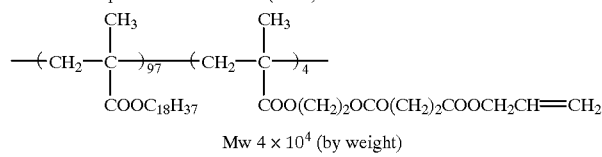

Mw $4 \times 10^4$ (by weight)

PRODUCTION EXAMPLE 127

Latex Particles (D-27) (Comparative Example B)

A white dispersion was synthesized in the same manner as in Production Example 108 with the exception that 10 g of the known resin for dispersion stabilization (RP-1) described above was used in place of 6 g of the resin for dispersion stabilization (P-14) in Production Example 108. Latex particles having a rate of polymerization of 93% and an average particle size of 0.44 μm were obtained. The Mw of the resin particles was $9\times10^4$ and the Tg thereof was 38° C.

EXAMPLE 1

Preparation of Lithographic Printing Plate Precursor

A mixture of 100 g of dry zinc oxide, 3.0 g of binding resin (B-1) having the following structure, 17.0 g of binding resin (B-2) having the following structure, 0.15 g of benzoic acid (A-1) and 155 g of toluene was dispersed using a wet disperser homogenizer (manufactured by Nippon Seiki Co., Ltd.) at $6\times10^3$ rpm for 8 minutes.

Binding Resin (B-1)

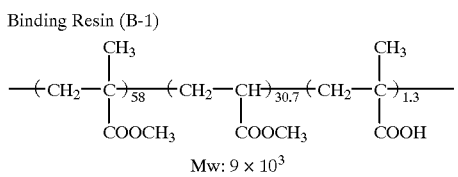

Mw: $9 \times 10^3$

-continued

Binding Resin (B-2)

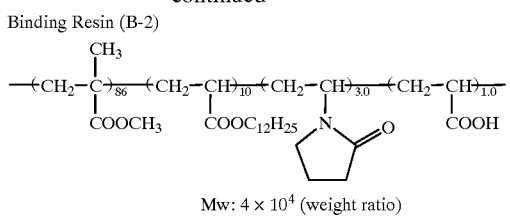

Mw: $4 \times 10^4$ (weight ratio)

Using a support (the smoothness of an under layer of the support: 500 (seconds/10 ml)) of an ELP-1 type master (trade name, manufactured by Fuji Photo Film Co., Ltd.) used as an electrophotographic lithographic printing precursor, the above-mentioned composition was applied onto the support using a wire bar and dried at 100° C. for 1 minute to form an image receiving layer having an amount coated of 20 g/m², thereby obtaining an lithographic printing plate precursor.

The contact angle of the image receiving layer with water was determined by placing 2 μl of distilled water on the printing plate precursor and measuring the surface contact angle (degrees) after 30 seconds with a surface contact angle meter (CA-D, manufactured by Kyowa Kaimen Kagaku Co., Ltd.). As a result, the contact angle was 102 degrees (higher value shows batter wettability to water and higher hydrophilicity).

Furthermore, the smoothness of the image receiving layer was determined by measuring the smoothness (second/10 ml) of the printing plate precursor using a Beck smoothness tester (manufactured by Kumagaya Riko Co., Ltd.) under the condition of an air volume of 10 ml, and it was 220 (seconds/10 ml).

The smoothness of the support shown above was also measured in the same manner as this method.

Preparation of Oil-Based Ink (IK-1)

Ten grams of dodecyl methacrylate/acrylic acid copolymer (copolymerization ratio: 95/5 by weight ratio), 10 g of Alkali Blue and 30 g of Shellsol were placed in a paint shaker (manufactured by Tokyo Seiki Co., Ltd.) together with glass beads, and dispersed for 4 hours to obtain a fine dispersion of Alkali Blue.

Fifty-five grams (as a solid amount) of resin particles (D-1) of Production Example 101, 18 g of the above-mentioned dispersion of Alkali Blue, and 0.10 g of an octadecene-half maleic acid octadecylamide copolymer were diluted with 1 liter of Isoper G, thereby obtaining blue oil-based ink.

A servo plotter, DA8400, manufactured by Graphtech Co., which can write an output from a personal computer, was converted so that the ink discharge head shown in FIG. 2 was mounted on a pen plotter section, and the lithographic printing plate precursor prepared as described above was placed on a counter electrode spaced at 1.5 mm. Printing was performed on the printing plate precursor using oil-based ink (IK-1) described above to conduct plate-making processing. Successively, heating was carried out for 10 seconds using a Ricoh Fuser Model 592 (manufactured by Ricoh Co., Ltd.), adjusting the surface temperature of an ink image surface to 65° C., thereby sufficiently fixing an image area.

A copied image of the resulting plate was visually observed under an optical microscope at a magnification of 200×. As a result, the copied image had no problem, thin lines and thin letters were good, abnormalities such as blurs, missing and dullness were not observed, and contamination was not observed in a non-image area.

The above-mentioned plate was immersed for 10 seconds in a treating solution prepared by diluting a desensitizing treating liquid, ELP-E2 (manufactured by Fuji Photo Film Co., Ltd.), 4 times with distilled water to desensitize the non-image area, thereby forming a printing plate.

Using as a fountain solution a solution prepared by diluting SLM-OD (manufactured by Mitsubishi Paper Mill, Ltd.) 8 times with water, and Oliver 94 type (manufactured by Sakurai Seisakusho Co., Ltd.) as a printing material, this printing plate was printed with Japanese ink for offset printing.

As a result, 3000 sheets or more of printed matter having clear images in which no toning was developed were obtained.

Then, using the above-mentioned ink jet printer, an ink jet test was made. An a result, stable ink jet was obtained even after an elapse of 800 hours. The ink stored at room temperature for 6 months showed no development of aggregates, and gave stable ink jet in the same jet test as described above.

When the plate-making processing printing plate under these conditions was actually printed, 3000 sheets or more of printed matter having clear images in which no toning was developed were obtained.

Furthermore, the redispersibility of the ink was evaluated under enforced conditions. That it, the discharge head used in the above-mentioned printer was filled with the ink, taken away and allowed to stand at 35° C. for 3 hours. Then, the discharge head was immersed in Isoper G for 3 minutes, followed by mild stirring. Thereupon, ink (IK-1) was all removed from the inside of the slit. That is, this is considered to be caused by that the ink of (IK-1) adhered to the leading edge of the slit of the discharge head in the non-fluid state by standing was easily redispersed by the solvation with the dispersing medium.

COMPARATIVE EXAMPLE A

Comparative Example A was conducted in the same manner as in Example 1 with the exception that oil-base ink (IKR-1) described below was used in place of oil-based ink (IK-1) used in Example 1.

Oil-Based Ink (IKR-1) for Comparison

Oil-base ink (IKR-1) was prepared in the same manner as in oil-based ink (IK-1) with the exception that 50 g (as a solid amount) of latex particle (D-26) for comparison was used in place of latex particle (D-1) used in oil-based ink (IK-1).

COMPARATIVE EXAMPLE B

Comparative Example B was conducted in the same manner as in Example 1 with the exception that oil-base ink (IKR-2) described below was used in place of oil-based ink (IK-1) used in Example 1.

Oil-Based Ink (IKR-2) for Comparison

Oil-base ink (IKR-2) was prepared in the same manner as in oil-based ink (IK-1) with the exception that 50 g (as a solid amount) of latex particles (D-27) for comparison was used in place of latex particles (D-1) used in oil-based ink (IK-1).

When the lithographic printing plates obtained in Comparative Examples A and B described above were first printed, 3000 sheets or more of printed material having clear images in which no toning was developed were obtained.

However, in the ink jet test, the ink in Comparative Examples A and B became unstable in ink jet after an elapse of about 200 hours and 400 hours, respectively. Furthermore, in the ink in Comparative Examples after 6 months of storage, coagulated precipitates were deposited, and were not redispersed even on shaking.

Furthermore, in Comparative Examples, the enforced test of the ink redispersibility was made under the same conditions as with Example 1. As a result, deposits remained in the slit of the discharge head section.

EXAMPLE 2 AND COMPARATIVE EXAMPLE C

Preparation of Lithographic Printing Plate Precursor

An lithographic printing plate precursor was obtained in the same manner as in Example 1 with the exception that an EPT laminated paper support (the smoothness of an under layer of the support: 1800 (seconds/10 ml)) of an ELP-IIX type master (trade name, manufactured by Fuji Photo Film Co., Ltd.) was used in place of the ELP-1 type master support used as the water-resistant support in Example 1.

Preparation of Oil-Based Ink (IK-2)

Ten grams of poly(dodecyl methacrylate), 10 g of Nigrosine and 30 g of Isoper H were placed in a paint shaker (manufactured by Tokyo Seiki Co., Ltd.) together with glass beads, and dispersed for 4 hours to obtain a fine dispersion of Nigrosine.

Fifty grams (as a solid amount) of resin particles (D-8) of Production Example 8 of resin particles, 35 g of the above-mentioned Nigrosine dispersion, and 0.12 g of an octadecyl vinyl ether-half maleic acid dodecylamide copolymer were diluted with 1 liter of Isoper G, thereby preparing black oil-based ink.

Using this printing plate precursor and oil-based ink (IK-2), plate-making processing was conducted, a printing plate was formed and offset printing was performed in the same manner as in Example 1.

The resulting printed matter had clear image quality with no stain in a non-image area, similar to the printed matter of Example 1, and the press life thereof was as good as 10000 sheets or more.

Furthermore, similar to Example 1, the ink jet test for 1000 hours and the enforced test of the redispersibility also showed the same good performance as that of ink (IK-1).

On the other hand, as Comparative Example C, a commercially available direct writing type printing precursor having a hydrophilic image receiving layer surface was used. The contact angle of the image receiving layer surface of this precursor with water was 5 degrees, and the value of the Beck smoothness was 200 seconds/10 ml.

For the image quality of the plate obtained by platemaking in the same manmer as in Example 2, blurs of images were significantly developed in thin lines and thin letters.

Further, the image receiving layer surface was a previously hydrophilized original, and printing was made as such. As a result, the missing of an image area occurred on the 500th copy from the start of printing.

EXAMPLES 3 to 8

Plate-making processing and printing were conducted in the same manner as in Example 1 with the exception that oil-based ink described in Table 7 shown below was used in place of oil-based ink (IK-1). The oil-based ink used was prepared in the same manner as in oil-based ink (IK-1) with the exception that 45 g (as a solid amount) of latex particles described Table 7 shown below were used in place of latex particles (D-1).

TABLE 7

| Example | Oil-based Ink | Latex Particles (D) |
|---|---|---|
| 3 | IK-3 | D-2 |
| 4 | IK-4 | D-3 |
| 5 | IK-5 | D-4 |
| 6 | IK-6 | D-5 |
| 7 | IK-7 | D-6 |
| 8 | IK-8 | D-7 |

The resulting printed material had clear image quality with no stain in a non-image area, similar to the printed material of Example 1, and the press life thereof was as good as 3000 sheets or more.

Furthermore, similar to Example 1, the ink jet test for 800 hours and the enforced test of the redispersibility also showed the same good performance as that of ink (IK-1).

EXAMPLES 9 to 22

Plate-making processing and printing were conducted in the same manner as in Example 2 with the exception that oil-based ink described in Table 8 shown below was used in place of oil-based ink (IK-2). The oil-based ink used was prepared in the same manner as in oil-based ink (IK-2) with the exception that 45 g (as a solid amount) of latex particles described Table 8 shown below were used in place of latex particles (D-15).

TABLE 8

| Example | Oil-based Ink | Latex Particles (D) |
|---|---|---|
| 9 | IK-9 | D-9 |
| 10 | IK-10 | D-10 |
| 11 | IK-11 | D-11 |
| 12 | IK-12 | D-12 |
| 13 | IK-13 | D-13 |
| 14 | IK-14 | D-14 |
| 15 | IK-15 | D-15 |
| 16 | IK-16 | D-16 |
| 17 | IK-17 | D-18 |
| 18 | IK-18 | D-19 |
| 19 | IK-19 | D-21 |
| 20 | IK-20 | D-23 |
| 21 | IK-21 | D-24 |
| 22 | IK-22 | D-20 |

The resulting printed material had clear image quality with no stain in a non-image area, similar to the printed material of Example 2, and the press life thereof was as good as 10000 sheets or more.

Furthermore, similar to Example 1, the ink jet test for 1000 hours and the enforced test of the redispersibility also showed the same good performance as that of ink (IK-2).

EXAMPLE 23

Preparation of Water-Resistant Support

Using woodfree paper having a basis weight of 100 g/m² as a substrate, one surface of the substrate was coated with a coating for an under layer having the following composition using a wire bar to form the under layer having a dry amount coated of 10 g/m². The smoothness of the surface of the under layer was 150 seconds/10 ml, and adjusted to 1500 (seconds/10 ml) by a calender treatment.

Coating for Under Layer

| | |
|---|---|
| Silica Gel | 10 parts |
| SBR Latex (50 wt % Aqueous Dispersion, Tg: 25° C.) | 92 parts |
| Clay (45 wt % Aqueous Dispersion) | 110 parts |
| Melamine (89-wt % Aqueous Solution) | 5 parts |
| Water | 191 parts |

The other surface of the substrate was further coated with a coating for a backcoat layer having the following Composition using a wire bar to form the backcoat layer having a dry amount coated of 12 g/m². Than, a calender treatment was conducted, establishing the calender conditions so that the smoothness of the backcoat layer is adjusted to about 50 (seconds/10 ml).

Coating for Backcoat Layer

| | |
|---|---|
| Kaolin (50% Aqueous Dispersion) | 200 parts |
| Aqueous Solution of Polyvinyl Alcohol (10%) | 60 parts |
| SBR Latex (Solid Content: 49%, Tg: 0° C.) | 100 parts |
| Initial Condensation Product of Melamine Resin (Solid Content: 80%, Sumilets Resin SR-613) | 5 parts |

Preparation of Lithographic Printing Plate Precursor

A mixture of 100 g of dry zinc oxide (manufactured by Seido Kagaku Co., Ltd.) identical to that used in Example 1, 16 g of binding resin (B-3) having the following structure, 4 g of binding resin (B-4) having the following structure, 0.336 g of 3-propoxybenzoic acid (A-12) and 155 g of toluene was dispersed using a wet disperser Keddy mill at $1 \times 10^4$ rpm for 20 minutes.

Binding Resin (B-3):

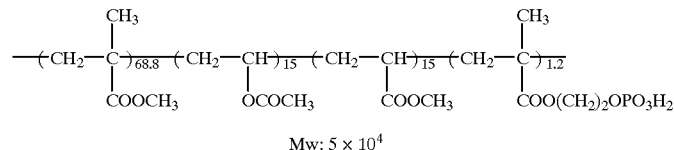

Mw: $5 \times 10^4$

Binding Resin (B-4):

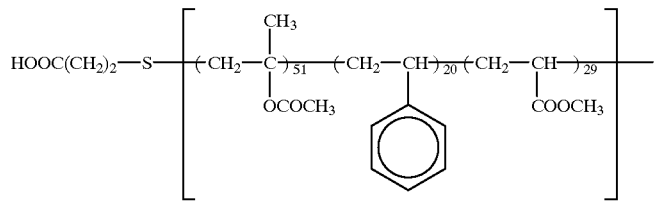

Mw: $8 \times 10^3$ (weight ratio)

This dispersion was applied onto the above-mentioned water-resistant support using a wire bar so as to give an amount coated of 12 g/m$^2$, and dried to prepare a lithographic printing plate precursor having a surface smoothness of 150 (seconds/10 ml). The degree of the hydrophobicity of a surface thereof was 102 degrees.

Using this printing plate precursor, plate-making processing was conducted, a desensitizing treatment was achieved to form a printing plate, and offset printing was performed in the same manmer as in Example 1, provided that oil-based ink (IK-23) described below was used in place of oil-based ink (IK-1) used in Example 1.

Oil-Based Ink (IK-23)

A mixture of 500 g of white dispersion (D-22) obtained in Production Example 122 of resin particles and 7.55 g of Sumikalon Black was heated to a temperature of 100° C., and stirred for 6 hours under heating. After cooling to room temperature, the product was passed through a 200-mesh nylon cloth to remove the remaining dye, thereby obtaining a black resin dispersion having an average particle size of 0.44 μm.

Then, 250 g of the above-mentioned black resin dispersion and 0.12 g of charge regulating agent (CD-3) were diluted with 1 liter of Isoper G, thereby preparing black oil-based ink.

CD-3:

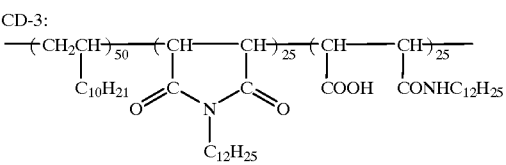

(molar composition ratio)

The resulting printed matter had clear image quality with no stain in a non-image area, similar to the printed matter of Example 2, and the press life thereof was as good as 10000 sheets or more.

Furthermore, similar to Example 2, the ink jet test for 1000 hours and the enforced test of the redispersibility also showed the same good performance as that of ink (IK-2).

EXAMPLE 24

Preparation of Lithographic Printing Plate Precursor

A mixture of 100 g of dry zinc oxide (manufactured by Seido Kagaku Co., Ltd.) identical to that used in Example 1, 14 g (as a solid amount) of binding resin (B-5) having the following structure, 1.5 g of an acrylic acid resin particle dispersion described below, 0.20 g of m-toluic acid, and 230 g of toluene was dispersed together with 200 g of glass beads having a particle size of 0.7 mm to 1 mm using a Dynomill disperser (manufactured by Shinmaru Enterprise Co. Ltd.) at $5 \times 10^3$ rpm for 10 minutes, and then, the glass beads were filtered off to prepare a coating for an image receiving layer.

Binding Resin (B-5):

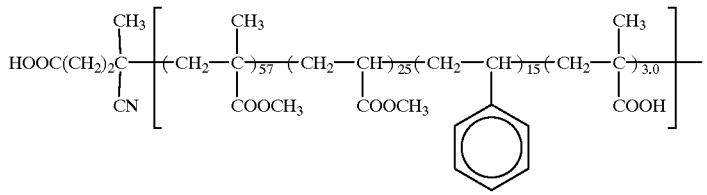

Mw: $5 \times 10^4$ (weight ratio)

Acrylic Acid Resin Particle Dispersion

A mixed solution of 8 g of acrylic acid, 2 g of AA-6 (trade name, manufactured by Toagosei Chemical Industry Co., Ltd.: a macromonomer of methyl methacrylate), 2 g of ethylene glycol dimethacrylate, 0.1 g of methyl 3-mercaptopropionate and 55 g of methyl ethyl ketone was heated to a temperature of 60° C. under a stream of nitrogen. Then, 0.2 g of 2,2'-azobis (isobutyronitrile) was added thereto to conduct a reaction for 3 hours, and 0.1 g of this initiator was further added to conduct the reaction for 4 hours. The resulting dispersion was 95% in the rate of reaction, 0.20 μm in the average particle size of the dispersed resin particles, and good in the monodispersibility (measurement of the particle size: CAPA-50, manufactured by Horiba, Ltd.).

This dispersion was applied onto a water-resistant support as used in Example 2 using a wire bar so as to give an amount coated of 18 g/m², and dried to prepare a lithographic printing plate precursor. The surface Beck smoothness of the resulting image receiving layer was 350 (seconds/10 ml). The degree of the hydrophobicity of a surface thereof was 97 degrees.

Using this printing plate precursor, plate-making processing was conducted, a desensitizing treatment was achieved to form a printing plate, and offset printing was performed in the same manmer as in Example 2, provided that oil-based ink (IK-24) described below was used in place of oil-based ink (IK-2) used in Example 2.

Oil-Based Ink (IK-24)

A mixture of 300 g of white dispersion (D-25) obtained in Production Example 125 of resin particles and 5 g of Victoria Blue B was heated to a temperature of 100° C., and stirred for 4 hours under heating. After cooling to room temperature, the product was passed through a 200-mesh nylon cloth to remove the remaining dye, thereby obtaining a blue resin dispersion having an average particle size of 0.40 μm.

Then, 260 g of the above-mentioned blue resin dispersion and 0.24 g of zirconium naphthenate were diluted with 1 liter of Shellsol 71, thereby preparing blue oil-based ink.

The resulting printed matter had clear image quality with no stain in a non-image area, similar to the printed matter of Example 2, and the press life thereof was as good as 10000 sheets or more.

Furthermore, similar to Example 2, the ink jet test for 1000 hours and the enforced test of the redispersibility also showed the same good performance as that of ink (IK-2).

PRODUCTION EXAMPLE 201

Macromonomer (MA-1)

A mixed solution of 100 g of octadecyl methacrylate, 2 g of 3-mercaptopropionic acid and 200 g of toluene was heated to a temperature of 70° C. with stirring under a steam of nitrogen. Then, 0.5 g of A.I.B.N. was added as a polymerization initiator thereto to conduct a reaction for 3 hours, 0.5 g of A.I.B.N. was further added to conduct the reaction for 3 hours, and 0.3 g of A.I.B.N. was still further added to conduct the reaction for 3 hours. Then, 8 g of glycidyl methacrylate, 1.0 g of N,N-dimethyldodecylamine and 0.5 g of t-butylhydroquinone were added to the reaction solution, and stirred at a temperature of 100° C. for 10 hours. After cooling, the reaction solution was reprecipitated in 2 liter of methanol to obtain 82 g of a white powder. The weight average molecular weight (Mw) of the polymer was $1 \times 10^4$ (the weight average molecular weight indicates a value converted to polystyrene by the G.P.C. method).

Macromonomer (MA-1):

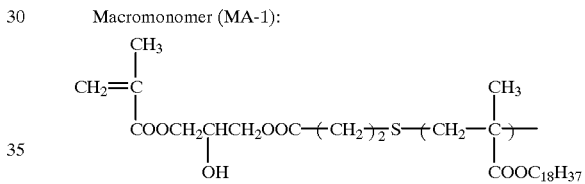

PRODUCTION EXAMPLES 202 to 211

Macromonomers (MA-2) to (MA-11)

Macromonomers (MA-2) to (MA-11) were synthesized in the game manner as in Production Example 201 of macromonomer (MA) with the exception that only octadecyl methacrylate is replaced by compounds corresponding to the following Table 9 in Production Example 201. The weight average molecular weight of each macromonomer obtained ranged from $9 \times 10^3$ to $1 \times 10^4$.

TABLE 9

$$CH_2=\underset{\underset{COOCH_2CHCH_2OOC-(CH_2)_2-S-(CH-C)-}{|}}{\overset{CH_3}{\underset{|}{C}}}\underset{OH}{\phantom{X}}\underset{X}{\overset{a_1\phantom{XX}a_2}{\phantom{X}}}$$

| Production Example | Macromonomer (MA) | $a_1/a_2$ | X |
|---|---|---|---|
| 202 | MA-2 | —H/—CH₃ | $\underset{COOC_{12}H_{25}}{\mid}$ |

TABLE 9-continued $$CH_2=\underset{\underset{OH}{|}}{\overset{\overset{CH_3}{|}}{C}}-COOCH_2CHCH_2OOC-(CH_2)_2-S-(CH-\overset{a_1}{C})-\overset{a_2}{\underset{X}{|}}$$

| Production Example | Macro-monomer (MA) | $a_1/a_2$ | X |
|---|---|---|---|
| 203 | MA-3 | —H/—CH$_3$ | $\|$<br>$COOC_{13}H_{27}$ |
| 204 | MA-4 | —H/—CH$_3$ | $\|$<br>$COOC_{16}H_{33}$ |
| 205 | MA-5 | —H/—H | $\|$<br>$COOC_{18}H_{37}$ |
| 206 | MA-6 | —H/—CH$_3$ | —(CH$_2$)$_2$OCO(CH$_2$)$_2$COOC$_2$H$_5$ |
| 207 | MA-7 | —H/—CH$_3$ | —(CH$_2$)$_2$OCO(CH$_2$)$_3$COOCH$_3$ |
| 208 | MA-8 | —H/—H | —(CH$_2$)$_2$OCOCH═CH—COOC$_5$H$_{11}$ |
| 209 | MA-9 | —H/—H | —CH$_2$CHCH$_2$OCOC$_6$H$_{13}$<br>$\|$<br>OCOC$_6$H$_{13}$ |
| 210 | MA-10 | —H/—CH$_3$ | —CH$_2$CHCH$_2$OCOC$_5$H$_{11}$<br>$\|$<br>OCOCH$_3$ |
| 211 | MA-11 | —H/—H | —(CH$_2$)$_2$OCO(CH$_2$)$_2$SO$_2$C$_8$H$_{17}$ |

PRODUCTION EXAMPLE 212

Macromonomer (MA-12)

A mixed solution of 100 g of tetradecyl methacrylate, 2 g of thioethanol and 200 g of toluene was heated to a temperature of 70° C. with stirring under a steam of nitrogen. Then, 1.0 g of A.I.B.N. was added as a polymerization initiator thereto to conduct a reaction for 4 hours, 0.5 g of A.I.B.N. was further added to conduct the reaction for 3 hours, and than, 0.3 g of A.I.B.N. was still further added to conduct the reaction for 3 hours. The reaction solution was cooled to room temperature, and 8 g of 2-carboxyethyl acrylate was added thereto. Then, a mixed solution of 12.7 g of D.C.C. and 60 g of methylene chloride was added dropwise thereto for 1 hour. Then, 1.0 g of t-butylhydroquinone was added, followed by stirring as such for 4 hours.

Crystals deposited were filtered off, and the resulting filtrate was reprecipitated in 2 liters of methanol. The precipitated oily product was collected by decantation, dissolved in 150 ml of methylene chloride, and reprecipitated again in 1 liter of methanol. The oily product was collected, and dried under reduced pressure to obtain a polymer having an Mw of $8\times10^3$ in a yield of 60 g.

Macromonomer (MA-12):

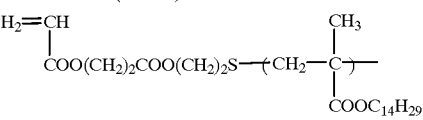

PRODUCTION EXAMPLES 213 to 215

Macromonomers (MA-13) to (MA-15)

Macromonomers shown in the following Table 10 were each produced in the same manner as in Production Example 212 described above with the exception that a methacrylate monomer (corresponding to tetradecyl methacrylate) and an unsaturated carboxylic acid (corresponding to 2-carboxyethyl methacrylate) were each replaced in Production Example 212. The weight average molecular weight of each macromonomer obtained in a yield of 60 to 70 g ranged from $7\times10^3$ to $9\times10^3$.

TABLE 10

| Production Example | Macromonomer (NA) | Chemical Structure of Micromonomer (MA) |
|---|---|---|
| 213 | MA-13 | $CH_2=\underset{\underset{COO(CH_2)_2S-(CH_2-\underset{\underset{COOC_{20}H_{41}}{\|}}{\overset{\overset{CH_3}{\|}}{C}})-}{\|}}{\overset{\overset{Cl}{\|}}{C}}$ |
| 214 | MA-14 | $CH_2=\underset{\underset{COO(CH_2)_2S-[(CH_2-\underset{\underset{COOC_{12}H_{25}}{\|}}{\overset{\overset{CH_3}{\|}}{C}})_{50}(CH_2-\underset{\underset{COOC_{18}H_{37}}{\|}}{CH})_{50}]}{\|}}{\overset{\overset{CN}{\|}}{C}}$ |

TABLE 10-continued

| Production Example | Macromonomer (NA) | Chemical Structure of Micromonomer (MA) |
|---|---|---|
| 215 | MA-15 | CH$_2$=C—C$_6$H$_4$—COO(CH$_2$)$_2$S—(CH$_2$—C(CH$_3$)(COO(CH$_2$)$_2$OCOC$_{10}$H$_{21}$))— |

PRODUCTION EXAMPLE 216

Macromonomer (MA-16)

A mixed solution of 100 g of 2,3-dihexanoyloxy methacrylate, 150 g of tetrahydrofuran and 50 g of isopropyl alcohol was heated to a temperature of 75° C. under a steam of nitrogen. Then, 5.0 g of 4,4'-azobis(4-cyanovaleric acid) (referred to as "A.C.V." simply) was added as a polymerization initiator thereto to conduct a reaction for 5 hours, and 1.0 g of A.C.V. was further added to conduct the reaction for 4 hours. After cooling, the reaction solution was reprecipitated in 1.5 liter of methanol, and the oily product was collected by decantation and dried under reduced pressure. The yield was 85 g.

A mixture of 50 g of this oily product, 15 g of glycidyl methacrylate, 1.0 g of N,N-dimethyldodecylamine, 1.0 g of 2,2'-methylene bis (6-t-butyl-p-cresol) and 100 g of toluene was stirred at a temperature of 100° C. for 15 hours. After cooling, the reaction solution was reprecipitated in 1 liter of petroleum ether to obtain 63 g of a white powder. The weight average molecular weight was 7×10$^3$.

Macromonomer (MA-16):

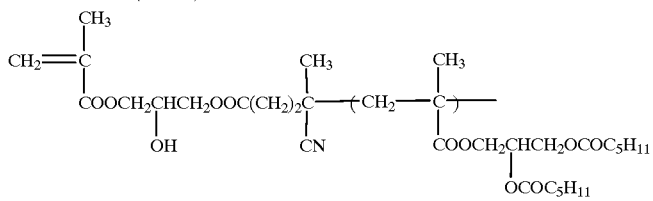

PRODUCTION EXAMPLE 301

Latex Particles (L-1)

A mixed solution of 8 g of resin for dispersion stabilization (P-1), 100 g of vinyl acetate, 1.0 g of macromonomer (MA-1) and 392 g of Isoper H was heated to a temperature of 70° C. with stirring under a steam of nitrogen. As a polymerization initiator, 1.0 g of A.I.V.N. was added thereto to conduct a reaction for 3 hours. Successively, 0.8 g of A.I.B.N. was added thereto, followed to conduct the reaction for 3 hours by heating to a temperature of 80° C. Then, the temperature was elevated to 100° C. and the resulting product was stirred for 2 hours to remove unreacted vinyl acetate by distillation. After cooling, the product was passed through a 200-mesh nylon cloth. The resulting white dispersion was a latex having a rate of polymerization of 98% and an average particle size of 0.22 μm. The particle size was measured with CAPA-500.

The above-mentioned white dispersion was partly centrifuged (the number of revolutions: 1×10$^4$ r.p.m., revolution time: 1 hour), and the sedimented resin particles were collected and dried. Then, the weight average molecular weight (Mw) and the glass transition temperature (Tg) of the resin particles were measured. As a result, the Mw was 2×10$^5$ (a value converted to polystyrene by G.P.C.), and the Tg was 38° C.

PRODUCTION EXAMPLE 302

Latex Particles (L-2)

A mixed solution of 8 g of resin for dispersion stabilization (P-17) and 177 g of Isoper H was heated to a temperature of 60° C. with stirring under a steam of nitrogen. As a polymerization initiator, a mixed solution of 25 g of methyl methacrylate, 75 g of methyl acrylate, 1.5 g of macromonomer (MA-12), 200 g of Isoper G and 1.0 g of A.I.V.N. was added dropwise thereto with 2 hours and stirred for 2 hours. Successively, 0.8 g of A.I.B.N. was added thereto, followed to conduct the reaction for 3 hours by heating to a temperature of 80° C. After cooling, the product was passed through a 200-mesh nylon cloth. The resulting white dispersion was a latex having a rate of polymerization of 100% and an average particle size of 0.22 μm. The Mw was 2×10$^5$, and the Tg was 26° C.

PRODUCTION EXAMPLES 303 to 312

Latex Particles (L-3) to (L-12)

Latex particles (L-3) to (L-12) of the present invention were produced in the same manner as in Production Example 301 described above with the exception that resins for dispersion stabilization (P) and macromonomers (MA) described in Table 11 shown below were each used in place of resin for dispersion stabilization (P-1) and macromonomer (MA-1) in Production Example 301.

The rate of polymerization of each latex particles thus obtained was 95% to 98%, the average particle size thereof ranged from 0.18 μm to 0.23 μm, and the monodispersibility was good. The Mw of each resin particles ranged from $1\times10^5$ to $3\times10^5$.

TABLE 11

| Production Example | Latex Particles (L) | Resin (P) | | Macromonomer (MA) | |
|---|---|---|---|---|---|
| 303 | L-3 | P-2 | 7 g | MA-2 | 1.0 g |
| 304 | L-4 | P-3 | 6 g | MA-5 | 1.0 g |
| 305 | L-5 | P-4 | 7 g | MA-7 | 1.5 g |
| 306 | L-6 | P-5 | 6 g | MA-8 | 1.6 g |
| 307 | L-7 | P-6 | 7 g | MA-9 | 1.2 g |
| 308 | L-8 | P-7 | 6 g | MA-11 | 2.0 g |
| 309 | L-9 | P-9 | 7 g | MA-12 | 0.8 g |
| 310 | L-10 | P-13 | 7 g | MA-10 | 2.0 g |
| 311 | L-11 | P-15 | 8 g | MA-15 | 2.5 g |
| 312 | L-12 | P-19 | 10 g | MA-16 | 2.0 g |

PRODUCTION EXAMPLES 313 to 321

Latex Particles (L-13) to (L-21)

Latex particles (L-13) to (L-21) of the present invention were produced in the same manner as in Production Example 302 with the exception that compounds described in Table 12 shown below were each used in place of monomers (A) (namely, methyl methacrylate and methyl acrylate), macromonomer (MA-12) and resin for dispersion stabilization (P-17) in Production Example 302.

The rate of polymerization of each latex particles thus obtained was 95% to 100%, the average particle size thereof ranged from 0.18 μm to 0.25 μm, and the monodispersibility was good.

The Mw of each resin particles ranged from $1\times10^5$ to $3\times10^5$.

tion that 8 g of resin for dispersion stabilization (P-1) used in Production Example 301 was replaced by 10 g of resin dispersion resin (PR-1) described in Peoduction Example 126. The rate of polymerization of the resulting latex particles was 95%, and the average particle size thereof was 0.21 μm. The Mw of the resin particles was $1\times10^5$, and the Tg was 38° C.

EXAMPLE 101

Preparation of Oil-Based Ink (IK-101)

Ten grams of dodecyl methacrylate/acrylic acid copolymer (copolymerization ratio: 95/5 by weight ratio), 10 g of Alkali Blue and 30 g of Shellsol 71 were placed in a paint shaker (manufactured by Tokyo Seiki Co., Ltd.) together with glass beads, and dispersed for 4 hours to obtain a fine dispersion of Alkali Blue.

Fifty grams (as a solid amount) of latex particles (D-1) of Production Example 301, 18 g of the above-mentioned Alkali Blue dispersion, and 0.08 g of an octadecene-half maleic acid octadecylamide copolymer were diluted with 1 liter of Isoper G, thereby obtaining blue oil-based ink.

A servo plotter, DA8400, manufactured by Graphtech Co., which can write an output from a personal computer, was converted so that the ink discharge head shown in FIG. 2 was mounted on a pen plotter section, and the precursor for lithographic printing prepared obtained in Example 1 was placed on a counter electrode spaced at 1.5 mm. Printing was performed on the precursor for lithographic printing by use of oil-based ink (IK-101) described above to conduct processing. Successively, heating was carried out for 20 seconds by use of a Ricoh Fuser Model 592 (manufactured by Ricoh Co., Ltd.), adjusting the surface temperature of an ink image surface to 70° C., thereby sufficiently fixing an image area.

A copied image of the resulting processed material (namely, the printing plate) was visually observed under an

TABLE 12

| Ex[1) | Latex (L) | Monomer (A) | | Resin (P) | | Macromonomer (MA) | | Resin Tg |
|---|---|---|---|---|---|---|---|---|
| 313 | L-13 | Methyl methacrylate | 50 g | P-16 | 8 g | MA-12 | 2.0 g | 27° C. |
| | | Ethyl acrylate | 50 g | | | | | |
| 314 | L-14 | Methyl methacrylate | 25 g | P-17 | 8 g | MA-3 | 2.5 g | 26° C. |
| | | Methyl acrylate | 75 g | | | | | |
| 315 | L-15 | Methyl methacrylate | 25 g | P-18 | 9 g | MA-1 | 1.5 g | 27° C. |
| | | Methyl acrylate | 75 g | | | | | |
| 316 | L-16 | Methyl methacrylate | 20 g | P-22 | 8 g | MA-16 | 2.0 g | 24° C. |
| | | Methyl acrylate | 80 g | | | | | |
| 317 | L-17 | Ethyl methacrylate | 45 g | P-23 | 7 g | MA-6 | 2.5 g | 25° C. |
| | | Ethyl acrylate | 55 g | | | | | |
| 318 | L-18 | Ethyl methacetate | 60 g | P-24 | 8 g | ML-14 | 1.0 g | 28° C. |
| | | Methyl acrylate | 40 g | | | | | |
| 319 | L-19 | Methyl methacrylate | 20 g | P-20 | 9 g | MA-13 | 1.5 g | 30° C. |
| | | 2-Cyanoethyl acrylate | 8 g | | | | | |
| | | Methyl acrylate | 72 g | | | | | |
| 320 | L-20 | Vinyl acetate | 80 g | P-11 | 8 g | MA-4 | 3.0 g | 34° C. |
| | | Crotonic aaid | 10 g | | | | | |
| | | Vinyl propionate | 10 g | | | | | |
| 321 | L-21 | Methyl methacrylate | 20 g | P-21 | 10 g | MA-14 | 2.0 g | 32° C. |
| | | Aarylic acid | 5 g | | | | | |
| | | Methyl acrylate | 75 g | | | | | |

[1)Production Example

PRODUCTION EXAMPLE 322

Latex Particles (L-22) (Comparative Example D)

A white dispersion for comparison was produced in the same manner as in Production Example 301 with the excepoptical microscope at a magnification of 200×. As a result, the copied image had no problem, fine lines and fine letters were good, abnormalities such as blurs, missing and dullness were not observed, and contamination was not observed in a non-image area.

After the above processing, printing was carried out in the same manner as in Example 1.

As a result, 3000 sheets or more of printed material having clear images in which no toning was developed were obtained.

Then, using the above-mentioned ink jet printer, an ink jet test was made. As a result, stable ink jet was obtained even after an elapse of 800 hours. The ink stored at room temperature for 6 months showed no development of aggregates, and gave stable ink jet in the same jet test as described above.

When the processed printing plate under these conditions was actually printed, 3000 sheets or more of printed material having clear images in which no toning was developed were obtained.

Furthermore, the redispersibility of the ink was evaluated under enforced conditions. That is, the discharge head used in the above-mentioned printer was filled with the ink, taken away and allowed to stand at 35° C. for 3 days. Then, the discharge head was immersed in Isoper G for 30 minutes, followed by mild stirring. Thereupon, ink (IK-101) was all removed from the inside of the slit. That is, this is considered to be caused by that the ink (IK-101) adhered to the leading edge of the slit of the discharge head in the non-fluid state by standing was easily redispersed by the solvation with the dispersing medium.

COMPARATIVE EXAMPLE D

Comparative Example D was conducted in the same manner as in Example 101 with the exception that oil-base ink (IKR-101) described below was used in place of oil-based ink (IK-101) used in Example 101.

Oil-Based Ink (IKR-101) for Comparison

Oil-base ink (IKR-101) was prepared in the same manner as in oil-based ink (IK-101) with the exception that 50 g (as a solid amount) of latex particles (L-22) for comparison was used in place of latex particles (L-1) used in oil-based ink (IK-101).

When the lithographic printing plate obtained in Comparative Example D described above ware first printed, 3000 sheets or more of printed material having clear images in which no toning was developed were obtained in the same manner as in Example 101. However, in the ink jet test, the ink in Comparative Example D became unstable in ink jet after an elapse of about 200 hours. Furthermore, in the ink in Comparative Example B after 6 months of storage, coagulated precipitates were deposited, and were not redispersed even on shaking.

Furthermore, in Comparative Example D, the enforced test of the ink redispersibility was made under the same conditions as with Example 101. As a result, deposits remained in the slit of the discharge head section.

EXAMPLE 102

Preparation of Lithographic Printing Plate Precursor

An lithographic printing plate precursor was obtained in the same manmer as in Example 101 with the exception that an EPT laminated paper support (the smoothness of an under layer of the support: 1800 (seconds/10 ml)) of an ELP-IIX type master (trade name, manufactured by Fuji Photo Film Co., Ltd.) was used in place of the ELP-1 type master support used as the water-resistant support in Example 101.

Preparation of Oil-Based Ink (IK-102)

Ten grams of poly(dodecyl methacrylate), 10 g of Nigrosine and 30 g of Isoper were placed in a paint shaker (manufactured by Tokyo Seiki Co., Ltd.) together with glass beads, and dispersed for 4 hours to obtain a fine dispersion of Nigrosine.

Fifty grams (as a solid amount) of resin particles (L-2) of Production Example 302 of resin particles, 35 g of the above-mentioned Nigrosine dispersion, and 0.12 g of an octadecyl vinyl ether-half maleic acid dodecylamide copolymer were diluted with 1 liter of Isoper G, thereby preparing black oil-based ink.

Using this printing plate precursor and oil-based ink (IK-102), plate-making processing was conducted, a printing plate was formed and offset printing was performed in the same manmer as in Example 101.

The resulting printed matter had clear image quality with no stain in a non-image area, similar to the printed matter of Example 1, and the press life thereof was as good as 10000 sheets or more.

Furthermore, similar to Example 101, the ink jet test for 800 hours and the enforced test of the redispersibility also showed the same good performance as that of ink (IK-101).

EXAMPLES 103 to 108

Plate-making processing and printing were conducted in the same manner as in Example 101 with the exception that oil-based ink described in Table 13 shown below was used in place of oil-based ink (IK-101). The oil-based ink used was prepared in the same manner as in oil-based ink (IK-101) with the exception that 45 g (as a solid amount) of latex particles described Table 13 shown below were used in place of latex particles (L-1).

TABLE 13

| Example | Oil-based Ink | Latex Particles (L) |
|---|---|---|
| 103 | IK-3 | L-2 |
| 104 | IK-4 | L-3 |
| 105 | IK-5 | L-4 |
| 106 | IK-6 | L-5 |
| 107 | IK-7 | L-6 |
| 108 | IK-8 | L-7 |

The resulting printed material had clear image quality with no stain in a non-image area, similar to the printed material of Example 101, and the press life thereof was as good as 3000 sheets or more.

Furthermore, similar to Example 101, the ink jet test for 800 hours and the enforced test of the redispersibility also showed the same good performance as that of ink (IK-1).

EXAMPLES 109 to 122

Plate-making processing and printing were conducted in the same manner as in Example 102 with the exception that oil-based ink described in Table 14 shown below was used in place of oil-based ink (IK-102). The oil-based ink used was prepared in the same manner as in oil-based ink (IK-102) with the exception that 45 g (as a solid amount) of latex particles described in Table 14 shown below were used in place of latex (D-2).

TABLE 14

| Example | Oil-based Ink | Latex Particles (L) |
|---|---|---|
| 109 | IK-9 | L-8 |
| 110 | IK-10 | L-9 |

TABLE 14-continued

| Example | Oil-based Ink | Latex Particles (L) |
|---|---|---|
| 111 | IK-11 | L-10 |
| 112 | IK-12 | L-11 |
| 113 | IK-13 | L-12 |
| 114 | IK-14 | L-13 |
| 115 | IK-15 | L-14 |
| 116 | IK-16 | L-15 |
| 117 | IK-17 | L-16 |
| 118 | IK-18 | L-17 |
| 119 | IK-19 | L-18 |
| 120 | IK-20 | L-19 |
| 121 | IK-21 | L-20 |
| 122 | IK-22 | L-1 |

The resulting printed material had clear image quality with no stain in a non-image area, similar to the printed material of Example 102, and the press life thereof was as good as 10000 sheets or more.

Furthermore, similar to Example 101, the ink jet test for 800 hours and the enforced test of the redispersibility also showed the same good performance as that of ink (IK-101).

EXAMPLE 123

Using the printing plate precursor obtained in Example 23, plate-making processing was conducted, a desensitizing treatment was achieved to form a printing plate, and offset printing was performed in the same manmer as in Example 101, provided that oil-based ink (IK-123) described below was used in place of oil-based ink (IK-101) used in Example 101.

Oil-Based Ink (IK-123)

A mixture of 500 g of white dispersion (L-4) obtained in Production Example 304 of resin particles and 7.5 g of Sumikalon Black was heated to a temperature of 100° C., and stirred for 6 hours under heating. After cooling to room temperature, the product was passed through a 200-mesh nylon cloth to remove the remaining dye, thereby obtaining a black resin dispersion having an average particle size of 0.20 µm.

Then, 250 g of the above-mentioned black resin dispersion and 0.1 g of charge regulating agent (CD-3) described in Example 23 were diluted with 1 liter of Isoper G, thereby preparing black oil-based ink.

The resulting printed matter had clear image quality with no stain in a non-image area, similar to the printed matter of Example 102, and the press life thereof was as good as 10000 sheets or more.

Furthermore, similar to Example 101, the ink jet test for 800 hours and the enforced test of the redispersibility also showed the same good performance as that of ink (IK-101).

EXAMPLE 124

Using this printing plate precursor, plate-making processing was conducted, a desensitizing treatment was achieved to form a printing plate, and offset printing was performed in the same manmer as in Example 102, provided that oil-based ink (IK-124) described below was used in place of oil-based ink (IK-102) used in Example 102.

Oil-Based Ink (IK-124)

A mixture of 300 g of white dispersion (L-21) obtained in Production Example 321 of resin particles and 5 g of Victoria Blue B was heated to a temperature of 100° C., and stirred for 4 hours under heating. After cooling to room temperature, the product was passed through a 200-mesh nylon cloth to remove the remaining dye, thereby obtaining a blue resin dispersion having an average particle size of 0.23 µm.

Then, 260 g of the above-mentioned blue resin dispersion and 0.09 g of zirconium naphthenate were diluted with 1 liter of Shellsol 71, thereby preparing blue oil-based ink.

The resulting printed matter had clear image quality with no stain in a non-image area, similar to the printed matter of Example 102, and the press life thereof was as good as 10000 sheets or more.

Furthermore, similar to Example 101, the ink jet test for 800 hours and the enforced test of the redispersibility also showed the same good performance as that of ink (IK-101).

While the invention has been described in detail and with reference to specific embodiments thereof, it will be apparent to one skilled in the art that various changes and modifications can be made therein without departing from the spirit and scope thereof.

What is claimed is:

1. A method for preparing a printing plate by an ink jet process comprising:

discharging an oily ink using an electrostatic field on an image receiving layer of a lithographic printing plate precursor from a head having a discharge electrode to form at image on the image receiving layer, and then desensitizing a non-image area of the image receiving layer by a chemical reaction to prepare a lithographic printing plate, wherein the lithographic printing plate precursor comprises a water-resistant support having provided thereon the image receiving layer, wherein the image receiving layer contains zinc oxide and a binder resin, wherein the surface of the image receiving layer has a contact angle with water of 50° or more, and wherein the oil-based ink comprises resin particles dispersed in a nonaqueous carrier liquid having an electric resistance of $10^9$ Ωcm or more and a dielectric constant of 3.5 or less, wherein said resin particles dispersed are copolymer resin particles obtained by polymerization granulation of a solution comprising (i) and (ii):

(i) at least one monofunctional monomer (A) which is soluble in a nonaqueous solvent which is at least miscible with the nonaqueous carrier liquid and becomes insoluble in the nonaqueous solvent by polymerization;

(ii) at least one resin for dispersion stabilization (P) which is soluble in the nonaqueous solvent and is a polymer comprising a repeating unit represented by the following formula (I), wherein a part of the polymer is crosslinked and a polymerizable double bond group which is copolymerizable with the monomer (A) is combined with only one end of at least one main chain of the polymer:

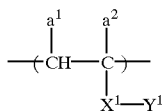
(I)

wherein $X^1$ represents —COO—, —OCO—, —CH$_2$OCO—, —CH$_2$COO—, —O— or —SO$_2$—;

$Y^1$ represents an aliphatic group having 10 to 32 carbon atoms; and $a^1$ and $a^2$ are the same or different and each represents a hydrogen atom, a halogen atom, a cyano group, a hydrocarbon group, —COO—$Z^1$, or —COO—$Z^1$ linked through a hydrocarbon group, in which $Z^1$ represents a hydrogen atom or a hydrocarbon group which may be substituted;

wherein the water-resistant support has a specific electric resistance of $10^{10}$ Ωcm or less at least at an area directly under the image receiving layer;

wherein the resin particles dispersed in the oily ink are electrically detectable particles positively or negatively charged;

wherein the surface of the image receiving layer faces the discharge electrode and a counter electrode is provided on the opposite side thereof.

2. The method as claimed in claim 1, wherein the water-resistant support is a support having a specific electric resistance of $10^{10}$ Ωcm or less as a whole of the support.

3. The method as claimed in claim 4, wherein the resin particles dispersed are copolymer particles obtained by polymerization granulation of a solution comprising the monofunctional monomer (A), the resin for dispersion stabilization (P), and at least one monomer (C) represented by the following formula (II-A) which is copolymerizable with the monomer (A):

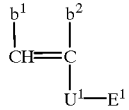
(II-A)

wherein $E^1$ represents an aliphatic group having 8 or more carbon atoms or a substituent having a total number of atoms of 8 or more, provided that hydrogen atoms directly attached to a carbon or nitrogen atom are excluded from the number, represented by the following formula (III-A):

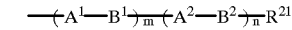
(III-A)

wherein $R^{21}$ represents a hydrogen atom or an aliphatic group having 1 to 18 carbon atoms;

$B^1$ and $B^2$ are the same or different and each represents —O—, —S—, —CO—, —CO$_2$—, —OCO—, —SO$_2$—, —N(R$^{22}$)—, —CON(R$^{22}$)—, —N(R$^{22}$)CO—, —N(R$^{22}$)SO$_2$—, —SO$_2$N(R$^{22}$)—, —NHCO$_2$— or —NHCONH—, in which $R^{22}$ has the same meaning as $R^{21}$;

$A^1$ and $A^2$ are the same or different and each represents at least one group selected from a group represented by the following formula (III-Aa) and a hydrocarbon group having 1 to 18 carbon atoms, which each may be substituted, provided that, in the case where $A^1$ or $A^2$ represents two or more groups selected from a group represented by the following formula (III-Aa) and a hydrocarbon group having 1 to 18 carbon atoms, $A^1$ or $A^2$ represents (1) two or more groups represented by formula (III-Aa), (2) a combination of at least one group represented by formula (III-Aa) and at least one hydrocarbon group having 1 to 18 carbon atoms, or (3) two or more hydrocarbon groups having 1 to 18 carbon atoms:

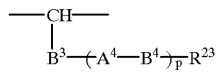
(III-Aa)

wherein $B^3$ and $B^4$ are the same or different and each has the same meaning as $B^1$ and $B^2$;

$A^4$ represents a hydrocarbon group having 1 to 18 carbon atoms which may be substituted;

$R^{23}$ has the same meaning as $R^{21}$; and m, n and p are the same or different and each represents an integer of 0 to 4, provided that m, n and p are not 0 at the same time;

$U^1$ represents —COO—, —CONH—, —CON(E$^2$)—, —OCO—, —CONHCOO—, —CH$_2$COO—, —(CH$_2$)$_s$OCO—, —O—, —C$_6$H$_4$— or —C$_6$H$_4$—COO—, in which $E^2$ represents an aliphatic group or a substituent represented by formula (III-A) described above, and s represents an integer of 1 to 4; and $b^1$ and $b^2$ are the same or different and each represents a hydrogen atom, a halogen atom, a cyano group, an alkyl group, —COO—$E^3$ or —CH$_2$COO—$E^3$, in which $E^3$ represents an aliphatic group.

4. The method as claimed in claim 1, wherein the resin particles dispersed are copolymer resin particles obtained by polymerization granulation of a solution comprising the monofunctional monomer (A), the resin for dispersion stabilization (P), and at least one monofunctional macromonomer (MA) having a weight average molecular weight of $1\times10^3$ to $2\times10^4$ obtained by combining a polymerizable double bond group represented by the following formula (IV-B) with only one end of a main chain of a polymer comprising a repeating unit corresponding to a monomer represented by the following formula (II-B):

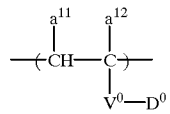
(II-B)

wherein $V^0$ represents —COO—, —OCO—, —(CH$_2$)$_r$COO—, —(CH$_2$)$_r$OCO, —O—, —SO$_2$—, —CONHCOO—, —CONHCONH—, —CON(D$^{11}$)—, —SO$_2$N(D$^{11}$)— or a phenylene group, in which $D^{11}$ represents a hydrogen atom or a hydrocarbon group having 1 to 22 carbon atoms, and r represents an integer of 1 to 4;

$a^{11}$ and $a^{12}$ are the same or different and each represents a hydrogen atom, a halogen atom, a cyano group, a hydrocarbon group, —COO—$D^{12}$, or —COO—$D^{12}$ linked through a hydrocarbon group, in which $D^{12}$ represents a hydrogen atom or a hydrocarbon group which may be substituted;

$D^0$ represents a hydrocarbon group having 8 to 22 carbon atoms or a substituent group having a total number of atoms of 8 or more, provided that hydrogen atoms attached to a carbon or nitrogen atom are excluded from the number, represented by the following formula (III-B):

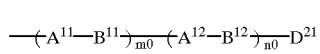  (III-B)

wherein $D^{21}$ represents a hydrogen atom or an aliphatic group having 1 to 22 carbon atoms;

$B^{11}$ and $B^{12}$ are the same or different and each represents —O—, —CO—, —CO$_2$—, —OCO—, —SO$_2$—, —N($D^{22}$)—, —CON($D^{22}$)—, or —N($D^{22}$)CO—, in which $D^{22}$ has the same meaning $D^{21}$;

$A^{11}$ and $A^{12}$ are the same or different and each represents at least one group selected from a group represented by the following formula (III-Ba) and a hydrocarbon group having 1 to 18 carbon atoms, which each may be substituted, provided that, in the case where $A^{11}$ or $A^{12}$ represents two or more groups selected from a group represented by the following formula (III-Ba) and a hydrocarbon group having 1 to 18 carbon atoms, $A^{11}$ or $A^{12}$ represents (1) two or more groups represented by formula (III-Ba), (2) a combination of at least one group represented by formula (III-Ba) and at least one hydrocarbon group having 1 to 18 carbon atoms, or (3) two or more hydrocarbon groups having 1 to 18 carbon atoms:

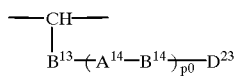  (III-Ba)

wherein $B^{13}$ and $B^{14}$ are the same or different and each has the same meaning as $B^{11}$ and $B^{12}$;

$A^{14}$ represents a hydrocarbon group having 1 to 18 carbon atoms which may be substituted;

$D^{23}$ has the same meaning as $D^{21}$; and $m^0$, $n^0$ and $p^0$ are the same or different and each represents an integer of 0 to 4, provided that in $m^0$, $n^0$ and $p^0$ are not 0 at the same time;

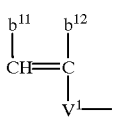  (IV-B)

wherein $V^1$ represents —COO—, —CONHCOO—, —CONHCONH—, —CONH— or a phenylene group; and $b^{11}$ and $b^{12}$ are the same or different and each has the same meaning as $a^{11}$ and $a^{12}$ in formula (II-B).

5. The method as claimed in claim 1, wherein said method consists essentially of said discharging and said desensitizing.

* * * * *